US012580428B2

(12) United States Patent (10) Patent No.: US 12,580,428 B2
Youn et al. (45) Date of Patent: Mar. 17, 2026

(54) DATA TRANSMISSION METHOD AND DEVICE IN WIRELESS POWER TRANSMISSION SYSTEM

(71) Applicant: LG Electronics Inc., Seoul (KR)

(72) Inventors: Jinho Youn, Seoul (KR); Gyunghwan Yook, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/288,533

(22) PCT Filed: Apr. 26, 2022

(86) PCT No.: PCT/KR2022/005960
§ 371 (c)(1),
(2) Date: Oct. 26, 2023

(87) PCT Pub. No.: WO2022/231278
PCT Pub. Date: Nov. 3, 2022

(65) Prior Publication Data
US 2024/0213817 A1 Jun. 27, 2024

(30) Foreign Application Priority Data

Apr. 26, 2021 (KR) ........................ 10-2021-0053921

(51) Int. Cl.
*H02J 50/80* (2016.01)
*H02J 50/12* (2016.01)
(Continued)

(52) U.S. Cl.
CPC .............. *H02J 50/80* (2016.02); *H02J 50/12* (2016.02); *H02J 50/40* (2016.02); *H04L 27/10* (2013.01)

(58) Field of Classification Search
CPC .. H02J 50/80; H02J 50/12; H02J 50/40; H02J 7/00034; H02J 50/10; H04L 27/10;
(Continued)

(56) References Cited

U.S. PATENT DOCUMENTS 10,164,482 B2 * 12/2018 Park ......................... H04B 5/79
10,581,272 B2 * 3/2020 Sankar ...................... H02J 7/04
(Continued)

FOREIGN PATENT DOCUMENTS

KR     10-2019-0000363 A     1/2019
KR         10-2024866 B1     9/2019
(Continued)

OTHER PUBLICATIONS

Extended European Search Report in European Appln. No. 22796111. 7, mailed on Sep. 4, 2024, 11 pages.
(Continued)

*Primary Examiner* — Daniel Kessie
*Assistant Examiner* — Brian K Baxter
(74) *Attorney, Agent, or Firm* — Fish & Richardson P.C.

(57) ABSTRACT

Provided in the present disclosure are a method by which a wireless power transmitter transmits wireless power in a wireless power transmission system, and a device using same, the method comprising: establishing a power transmission contract with a wireless power receiver in a negotiation phase; and transmitting, to the wireless power receiver, wireless power on the basis of the power transmission contract in a power transmission phase, wherein: the wireless power transmitter receives request information from the wireless power receiver in the negotiation phase; the request information is information related to the unit size of at least one piece of auxiliary data transport (ADT) information transmitted by means of the wireless power transmitter; and the wireless power transmitter transmits, to
(Continued)

the wireless power receiver, the at least one piece of ADT information in the power transmission phase on the basis of the information related to the unit size.

5 Claims, 30 Drawing Sheets

(51) Int. Cl.
*H02J 50/40* (2016.01)
*H04L 27/10* (2006.01)

(58) Field of Classification Search
CPC ....... H04L 27/106; H04L 27/12; H04L 69/24; H04L 27/02; H04B 5/72; H04B 5/79
See application file for complete search history.

(56) References Cited

U.S. PATENT DOCUMENTS

| | | | | |
|---|---|---|---|---|
| 10,886,973 | B2 * | 1/2021 | Park .................... | H04L 63/0823 |
| 11,005,307 | B2 * | 5/2021 | Park ......................... | H02J 50/12 |
| 2015/0137746 | A1 * | 5/2015 | Lee ..................... | H02J 7/00036 |
| | | | | 320/108 |
| 2017/0207663 | A1 * | 7/2017 | Park ...................... | H02J 50/402 |

| | | | | |
|---|---|---|---|---|
| 2019/0273404 | A1 * | 9/2019 | Angara ................... | H02J 50/12 |
| 2019/0296799 | A1 * | 9/2019 | Park ....................... | H02J 50/402 |
| 2019/0372403 | A1 * | 12/2019 | Park ......................... | H04B 5/79 |
| 2020/0251937 | A1 | 8/2020 | Park | |
| 2020/0252886 | A1 * | 8/2020 | Park ...................... | H04W 52/34 |
| 2020/0274401 | A1 * | 8/2020 | Park .................. | H02J 13/00026 |
| 2020/0280342 | A1 * | 9/2020 | Park ......................... | H02J 50/10 |
| 2021/0044152 | A1 * | 2/2021 | Park ........................ | H02J 50/10 |
| 2021/0242907 | A1 * | 8/2021 | Sherman ................. | H02J 50/80 |
| 2021/0376666 | A1 * | 12/2021 | AbuKhalaf ............. | H02J 50/80 |
| 2021/0399581 | A1 * | 12/2021 | Stingu ................... | F21V 23/003 |
| 2022/0060062 | A1 * | 2/2022 | Rosu-Hamzescu ...... | H04B 5/79 |
| 2022/0070017 | A1 * | 3/2022 | Patne ..................... | H04L 12/40 |

FOREIGN PATENT DOCUMENTS

| | | |
|---|---|---|
| KR | 10-2021-0009402 A | 1/2021 |
| WO | WO 2020/130265 A1 | 6/2020 |
| WO | WO 2021/045526 A1 | 3/2021 |
| WO | WO 2021/177726 A2 | 9/2021 |

OTHER PUBLICATIONS

International Search Report and Written Opinion in International Appln. No. PCT/KR2022/005960, mailed on Jul. 26, 2022, 13 pages (with English translation).

* cited by examiner

FIG. 5

Host (470)

BR/EDR Profile
(25)

Generic Access Profile
(GAP, 24)

Generic Attribute Profile
(GATT, 23)

Attribute Protocol
(ATT, 22)

Logical Link Control and Adaptation Protocol
(L2CAP, 21)

Host Controller Interface
(HCI, 18)

Link Manager
(LL, 16)

Link Controller
(LL, 14)

PHY
(12)

Controller (460)

(a) BR/EDR Protocol Stack

Host (490)

LE Profile
(46)

Generic Access Profile
(GAP, 45)

Generic Attribute Profile
(GATT, 44)

Attribute Protocol
(ATT, 43)

Security Manager
(SM, 42)

Logical Link Control and Adaptation Protocol
(L2CAP, 21)

Host Controller Interface
(HCI, 36)

Link Layer
(LL, 34)

PHY
(32)

Controller (480)

(b) LE Protocol Stack

|        | $b_7$ | $b_6$ | $b_5$ | $b_4$ | $b_3$ | $b_2$ | $b_1$ | $b_0$ |
|--------|-------|-------|-------|-------|-------|-------|-------|-------|
| $B_0$  | '00'  |       | Reference Power | | | | | |
| $B_1$  | Reserved | | | | | | | |
| $B_2$  | ZERO  | AI    | Reserved | OB | ZERO | Count | | |
| $B_3$  | Window Size | | | | Window Offset | | | |
| $B_4$  | Neg   | Pol   | Depth | | Buffer Size | | | Dup |

Extended Power Transfer Contract

|       | b7       | b6  | b5    | b4 | b3 | b2        | b1   | b0  |
|-------|----------|-----|-------|----|----|-----------|------|-----|
| B0    | Reserved |     | Negotiable Load Power |    |    |           |      |     |
| B1    | Reserved |     | Potential Load Power  |    |    |           |      |     |
| B2    | Dup      | AR  | OB    | Buffer Size |    |           | WPID | NRS |

FIG. 18

|  | b7 | b6 | b5 | b4 | b3 | b2 | b1 | b0 |
|---|---|---|---|---|---|---|---|---|
| B0 | Request | | | | | (msb) | | |
| B1 | Parameter | | | | | | | (lsb) |

FIG. 19

|  | b7 | b6 | b5 | b4 | b3 | b2 | b1 | b0 |
|---|---|---|---|---|---|---|---|---|
| B0 | Data | | | | | | | |
| ⋮ | | | | | | | | |
| Bn | | | | | | | | |

FIG. 22

|  | ADT : 7bytes | ADT : 4bytes |
|---|---|---|
| Get-digest (RX->TX) | 671ms | 672ms |
| Waiting time | 1040ms | 1040ms |
| Digest (TX->RX) | 4380ms | 5692ms |
| Waiting time | 1008ms | 592ms |
| Get-certificate (RX->TX) | 687ms | 687ms |
| Waiting time | 1024ms | 1040ms |
| Certificate (TX->RX) | 61851ms | 86485ms |
| Waiting time | 748ms | 719ms |
| Challenge (RX->TX) | 1745ms | 1743ms |
| Waiting time | 1487ms | 1503ms |
| Challenge_auth (TX->RX) | 7481ms | 10313ms |
| Total time | 82122ms | 110486ms |

FIG. 23

|  | ADT Size : 7bytes Criteria | ADT Size : 4bytes Criteria |
|---|---|---|
| ASK communcation time | 3103ms | 3102ms |
| FSK communcation time | 73712ms | 102490ms |

FIG. 25

| Header | Mnemonic | Name | Size |
|--------|----------|------|------|
| 0xA4 | PROP/12 | Proprietary | 12 |
| 0xA5 | PROP/12 | Proprietary | 12 |
| 0xA6 | ADT/12e | Data Stream Payload | 12 |
| 0xA7 | ADT/12e | Data Stream Payload | 12 |
|  |  |  |  |
| 0xDE | PROP/19 | Proprietary | 19 |
| 0xDF | PROP/19 | Proprietary | 19 |
|  |  |  |  |
| 0xE6 | ADT/21e | Data Stream Payload | 21 |
| 0xE7 | ADT/21e | Data Stream Payload | 21 |
|  |  |  |  |
| 0xFA | PROP/26 | Proprietary | 26 |
| 0xFB | PROP/26 | Proprietary | 26 |
| 0xFC | ADT/27e | Data Stream Payload | 27 |
| 0xFD | ADT/27e | Data Stream Payload | 27 |

FIG. 28

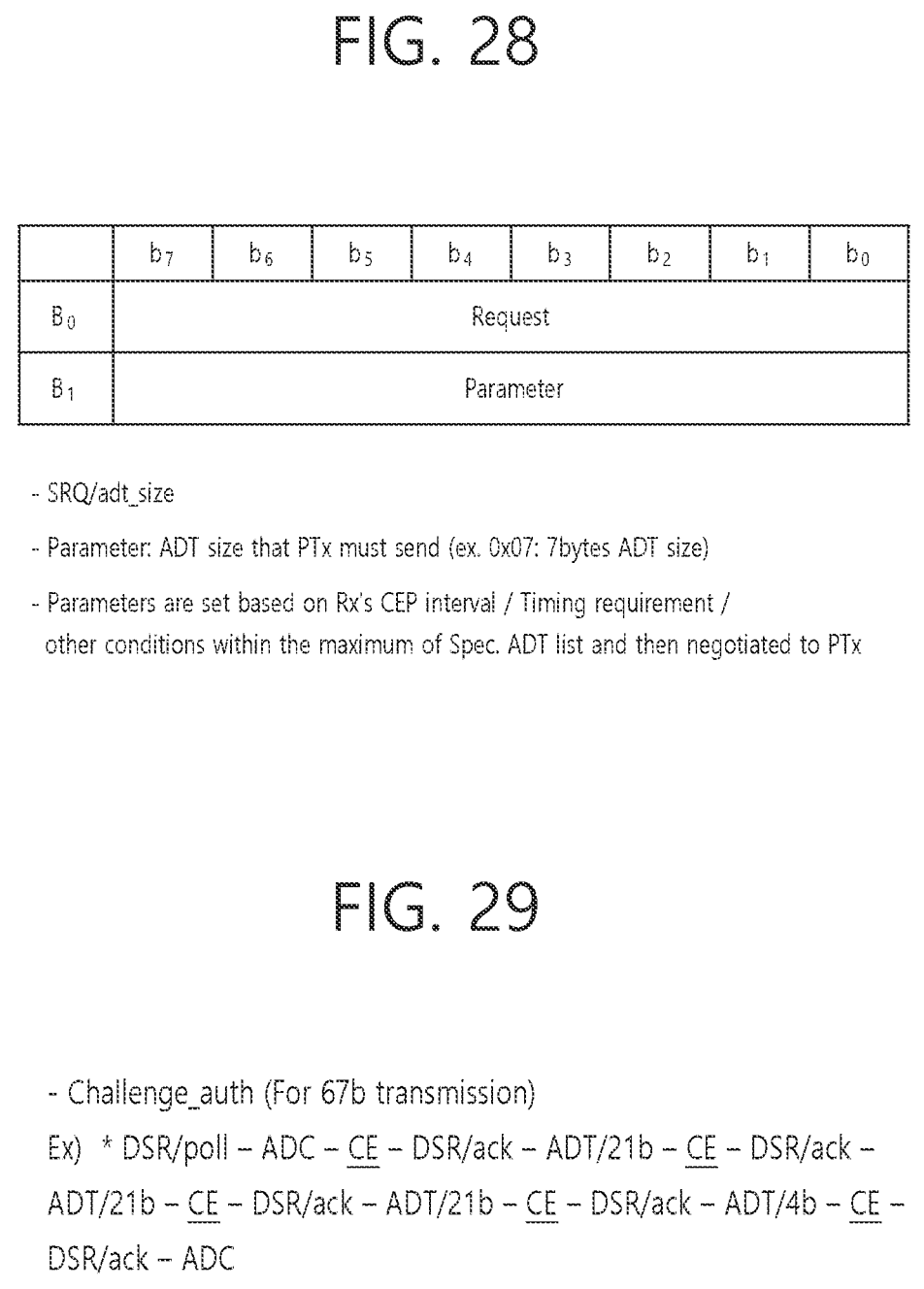

|        | $b_7$ | $b_6$ | $b_5$ | $b_4$ | $b_3$ | $b_2$ | $b_1$ | $b_0$ |
|--------|-------|-------|-------|-------|-------|-------|-------|-------|
| $B_0$  | Request |
| $B_1$  | Parameter |

- SRQ/adt_size

- Parameter: ADT size that PTx must send (ex. 0x07: 7bytes ADT size)

- Parameters are set based on Rx's CEP interval / Timing requirement /
  other conditions within the maximum of Spec. ADT list and then negotiated to PTx

FIG. 29

- Challenge_auth (For 67b transmission)

Ex) * DSR/poll – ADC – CE – DSR/ack – ADT/21b – CE – DSR/ack –
ADT/21b – CE – DSR/ack – ADT/21b – CE – DSR/ack – ADT/4b – CE –
DSR/ack – ADC

FIG. 32

| | b7 | b6 | b5 | b4 | b3 | b2 | b1 | b0 |
|---|---|---|---|---|---|---|---|---|
| B0 | Request | | | | | | | |
| B1 | Parameter | | | | | | | |

- SRQ/max.adt_size

- Parameter: "Max. ADT size" that PTx must send (ex. 0x07: ADT must be transmitted within
  7 bytes ADT size. More than 8 bytes cannot be transmitted)

- Parameters are set based on Rx's CEP interval / Timing requirement / other conditions within
  the maximum of Spec. ADT list and then negotiated to PTx

- If a fast control loop is desired, select SRQ/max.adt_size within a small size,
  if priority is given to data transmission, select the maximum in "Spec. ADT list"

FIG. 33

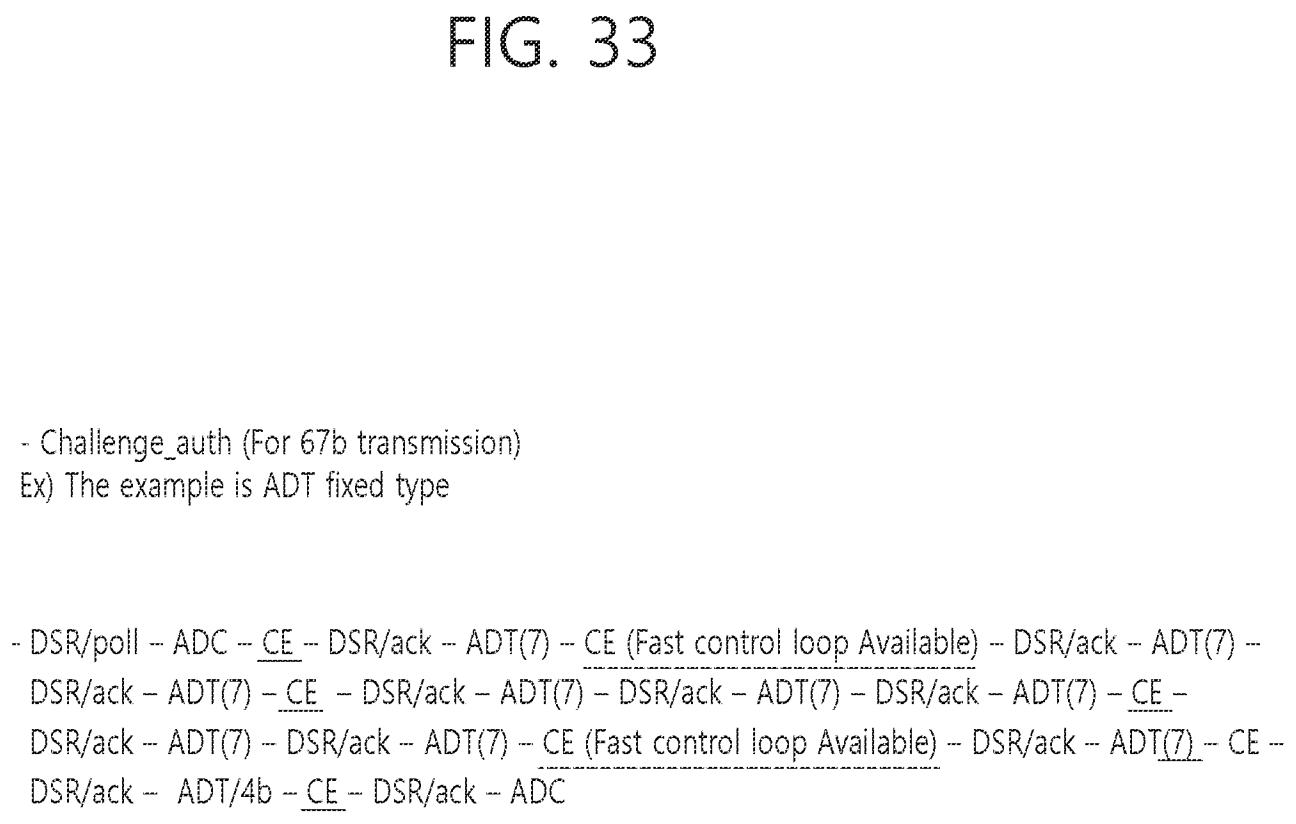

- Challenge_auth (For 67b transmission)

Ex) The example is ADT fixed type

- DSR/poll – ADC – CE – DSR/ack – ADT(7) – CE (Fast control loop Available) – DSR/ack – ADT(7) –

DSR/ack – ADT(7) – CE – DSR/ack – ADT(7) – DSR/ack – ADT(7) – DSR/ack – ADT(7) – CE –

DSR/ack – ADT(7) – DSR/ack – ADT(7) – CE (Fast control loop Available) – DSR/ack – ADT(7) – CE –

DSR/ack – ADT/4b – CE – DSR/ack – ADC

FIG. 36

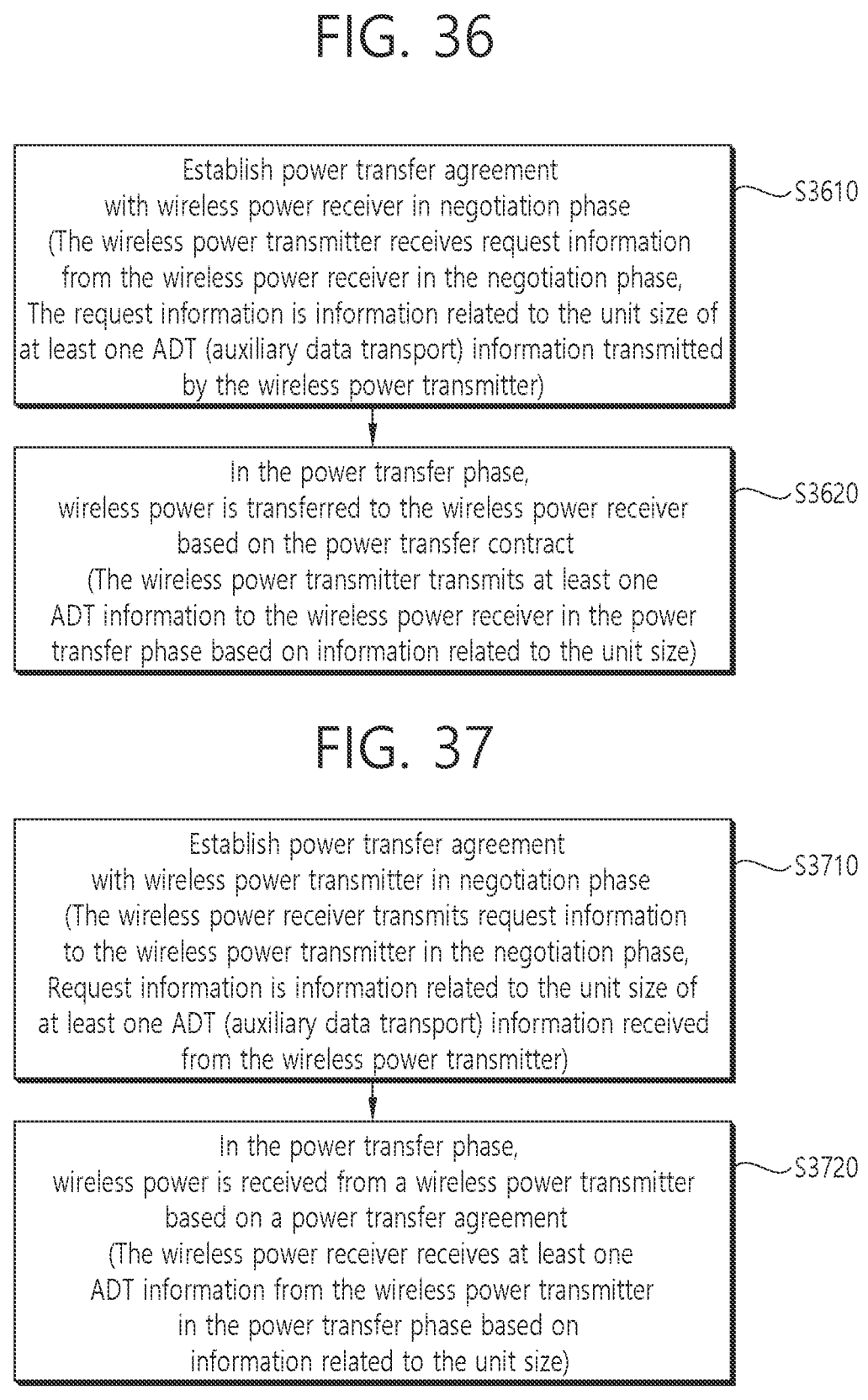

Establish power transfer agreement
with wireless power receiver in negotiation phase
(The wireless power transmitter receives request information
from the wireless power receiver in the negotiation phase,
The request information is information related to the unit size of
at least one ADT (auxiliary data transport) information transmitted
by the wireless power transmitter) — S3610

In the power transfer phase,
wireless power is transferred to the wireless power receiver
based on the power transfer contract
(The wireless power transmitter transmits at least one
ADT information to the wireless power receiver in the power
transfer phase based on information related to the unit size) — S3620

FIG. 37

Establish power transfer agreement
with wireless power transmitter in negotiation phase
(The wireless power receiver transmits request information
to the wireless power transmitter in the negotiation phase,
Request information is information related to the unit size of
at least one ADT (auxiliary data transport) information received
from the wireless power transmitter) — S3710

In the power transfer phase,
wireless power is received from a wireless power transmitter
based on a power transfer agreement
(The wireless power receiver receives at least one
ADT information from the wireless power transmitter
in the power transfer phase based on
information related to the unit size) — S3720

DATA TRANSMISSION METHOD AND DEVICE IN WIRELESS POWER TRANSMISSION SYSTEM

CROSS-REFERENCE TO RELATED APPLICATIONS

This application is a National Stage application under 35 U.S.C. § 371 of International Application No. PCT/KR2022/005960, filed on Apr. 26, 2022, which claims the benefit of Korean Patent Application No. 10-2021-0053921, filed on Apr. 26, 2021. The disclosures of the prior applications are incorporated by reference in their entirety.

TECHNICAL FIELD

This specification relates to wireless power transfer.

BACKGROUND

The wireless power transfer (or transmission) technology corresponds to a technology that may wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transfer system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

Meanwhile, in wireless charging, it is intended to provide a data transmission method and a device using the same.

SUMMARY

According to an embodiment of the present specification, a method and apparatus where the wireless power transmitter receives request information from the wireless power receiver in a negotiation phase, the request information is information related to the unit size of at least one ADT (auxiliary data transport) information transmitted by the wireless power transmitter, and the wireless power transmitter transmits at least one ADT information to the wireless power receiver in the power transfer phase based on information related to the unit size may be provided.

According to the present specification, the effect of substantially reducing data transmission time can occur.

Effects obtainable through specific examples of the present specification are not limited to the effects listed above. For example, there may be various technical effects that a person having ordinary skill in the related art can understand or derive from this specification. Accordingly, the specific effects of the present specification are not limited to those explicitly described in the present specification, and may include various effects that can be understood or derived from the technical features of the present specification.

BRIEF DESCRIPTION OF THE DRAWINGS

FIG. 5 is a diagram illustrating an example of a Bluetooth communication architecture to which an embodiment according to the present disclosure may be applied.

FIG. 18 schematically shows an example of an ADC packet.

FIG. 19 schematically shows an example of an ADT packet.

FIGS. 22 and 23 schematically show examples of the time required for authentication through a data transport stream.

FIG. 25 schematically shows an example of increased ADT packet size.

FIG. 28 shows an example of information requesting a fixed ADT size.

FIG. 29 schematically shows an example in which ADT information is transmitted from a wireless power transmitter to a wireless power receiver based on the negotiated fixed ADT size.

FIG. 32 shows an example of information requesting the maximum ADT size.

FIG. 33 schematically shows an example in which ADT information is transmitted from a wireless power transmitter to a wireless power receiver based on the negotiated maximum ADT size.

FIG. 36 is a flowchart of a method for transferring wireless power performed by a wireless power transmitter, according to an embodiment of the specification.

FIG. 37 is a flowchart of a method of receiving wireless power performed by a wireless power receiver, according to an embodiment of the present specification.

In this specification, "A or B" may refer to "only A", "only B" or "both A and B". In other words, "A or B" in this specification may be interpreted as "A and/or B". For example, in this specification, "A, B, or C" may refer to "only A", "only B", "only C", or any combination of "A, B and C".

The slash (/) or comma used in this specification may refer to "and/or". For example, "A/B" may refer to "A and/or B". Accordingly, "A/B" may refer to "only A", "only B", or "both A and B". For example, "A, B, C" may refer to "A, B, or C".

In this specification, "at least one of A and B" may refer to "only A", "only B", or "both A and B". In addition, in this specification, the expression of "at least one of A or B" or "at least one of A and/or B" may be interpreted to be the same as "at least one of A and B".

Also, in this specification, "at least one of A. B and C" may refer to "only A", "only B", "only C", or "any combination of A, B and C". Also, "at least one of A, B or C" or "at least one of A, B and/or C" may refer to "at least one of A, B and C".

In addition, parentheses used in the present specification may refer to "for example". Specifically, when indicated as "control information (PDCCH)", "PDCCH" may be proposed as an example of "control information". In other words, "control information" in this specification is not limited to "PDCCH", and "PDCCH" may be proposed as an example of "control information". In addition, even when indicated as "control information (i.e., PDCCH)", "PDCCH" may be proposed as an example of "control information".

In the present specification, technical features that are individually described in one drawing may be individually or simultaneously implemented. The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones. iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
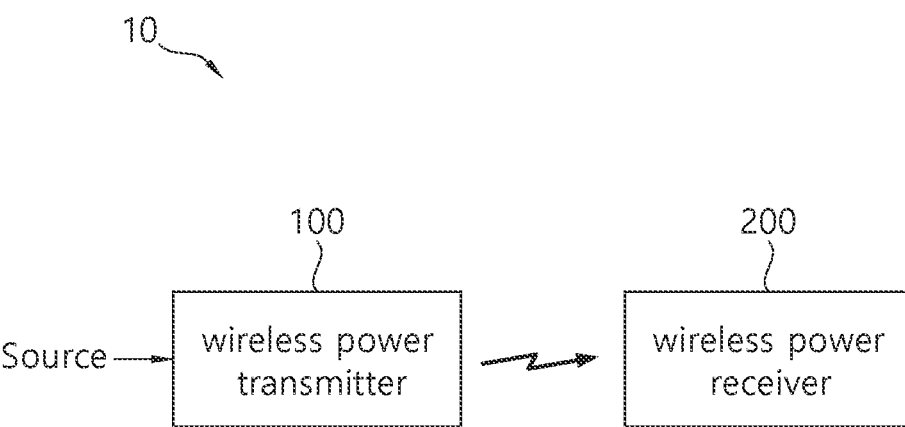
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth. Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
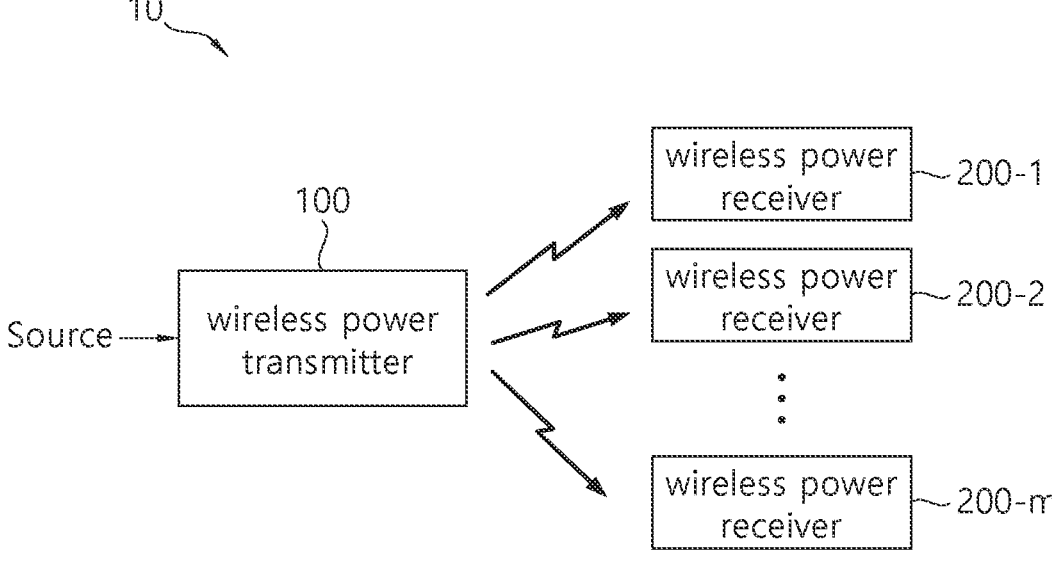
FIG. 2 is a block diagram of a wireless power system (10) according to another exemplary embodiment of the present disclosure.

FIG. 2 is a block diagram of a wireless power system (10) according to another exemplary embodiment of the present disclosure.

Referring to FIG. 2, in the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3:
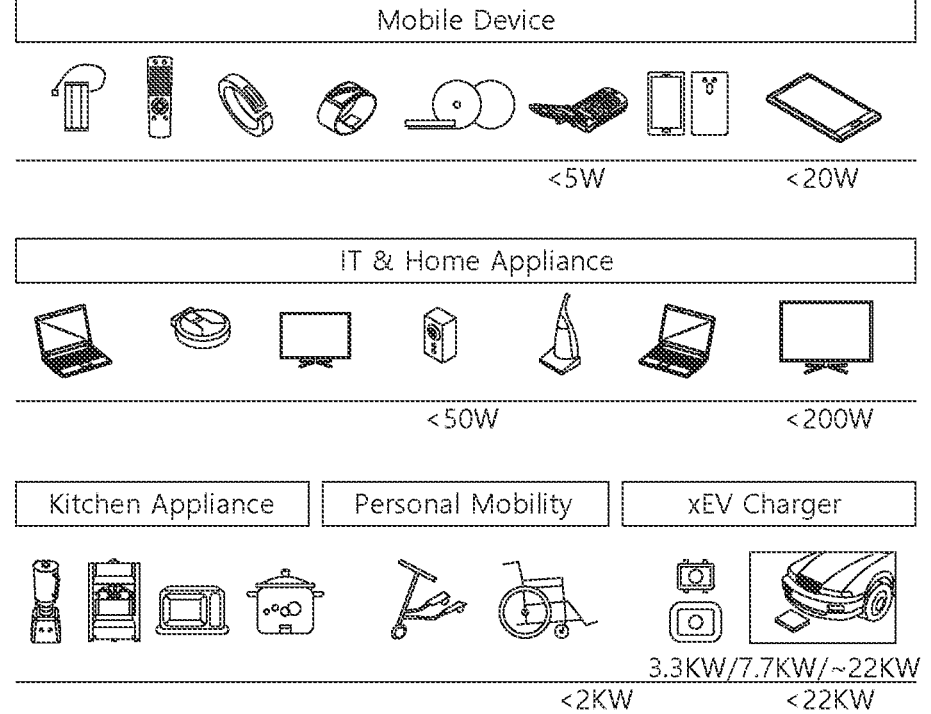
FIG. 3 shows an exemplary embodiment of diverse electronic devices adopting a wireless power transfer system.

FIG. 3 shows an exemplary embodiment of diverse electronic devices adopting a wireless power transfer system.

As shown in FIG. 3, the electronic devices included in the wireless power transfer system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or re-charged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an overvoltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

As an example, a user can experience a smart wireless charging service in a hotel. When a user enters a hotel room and places the smartphone on the wireless charger in the room, the wireless charger transmits wireless power to the smartphone, and the smartphone receives wireless power. In this process, the wireless charger transmits information about the smart wireless charging service to the smartphone. When the smartphone detects that it is placed on the wireless charger, detects reception of wireless power, or when the smartphone receives information about the smart wireless charging service from the wireless charger, the smartphone enters a state where it asks the user for consent (opt-in) to additional features. To this end, the smartphone can display a message on the screen with or without an alarm sound. An example of a message may include phrases such as "Welcome to ###hotel. Select "Yes" to activate smart charging functions. Yes No Thanks." The smartphone receives the user's input of selecting Yes or No Thanks and performs the next procedure selected by the user. If Yes is selected, the smartphone transmits the information to the wireless charger. And the smartphone and wireless charger perform the smart charging function together.

Smart wireless charging service may also include receiving auto-filled WiFi credentials. For example, a wireless charger transmits WiFi credentials to a smartphone, and the smartphone runs the appropriate app and automatically enters the WiFi credentials received from the wireless charger.

Smart wireless charging service may also include running a hotel application that provides hotel promotions, remote check-in/check-out, and obtaining contact information.

As another example, users can experience smart wireless charging services within a vehicle. When the user gets into the vehicle and places the smartphone on the wireless charger, the wireless charger transmits wireless power to the smartphone, and the smartphone receives wireless power. In this process, the wireless charger transmits information about the smart wireless charging service to the smartphone. When the smartphone detects that it is placed on the wireless charger, detects reception of wireless power, or when the smartphone receives information about the smart wireless charging service from the wireless charger, the smartphone enters a state where it asks the user to confirm his or her identity.

In this state, the smartphone automatically connects to the car via WiFi and/or Bluetooth. The smartphone can display the message on the screen with or without an alarm sound. An example of a message may include phrases such as "Welcome to your car. Select "Yes" to synch device with in-car controls: Yes|No Thanks." The smartphone receives the user's input of selecting Yes or No Thanks and performs the next procedure selected by the user. If Yes is selected, the smartphone transmits the information to the wireless charger. And by running the in-vehicle application/display software, the smartphone and wireless charger can perform in-vehicle smart control functions together. Users can enjoy the music they want and check regular map locations. In-vehicle application/display software may include the capability to provide synchronized access for pedestrians.

As another example, users can experience smart wireless charging at home. When a user enters a room and places the smartphone on the wireless charger in the room, the wireless charger transmits wireless power to the smartphone, and the smartphone receives wireless power. In this process, the wireless charger transmits information about the smart wireless charging service to the smartphone. When the smartphone detects that it is placed on the wireless charger, detects reception of wireless power, or when the smartphone receives information about the smart wireless charging service from the wireless charger, the smartphone enters a state where it asks the user for consent (opt-in) to additional features. To this end, the smartphone can display a message on the screen with or without an alarm sound. An example of a message may include phrases such as "Hi xxx, Would you like to activate night mode and secure the building?: Yes|No Thanks." The smartphone receives the user's input of selecting Yes or No Thanks and performs the next procedure selected by the user. If Yes is selected, the smartphone transmits the information to the wireless charger. Smartphones and wireless chargers can at least recognize user patterns and encourage users to lock doors and windows, turn off lights, or set alarms.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF).

Figure 4:
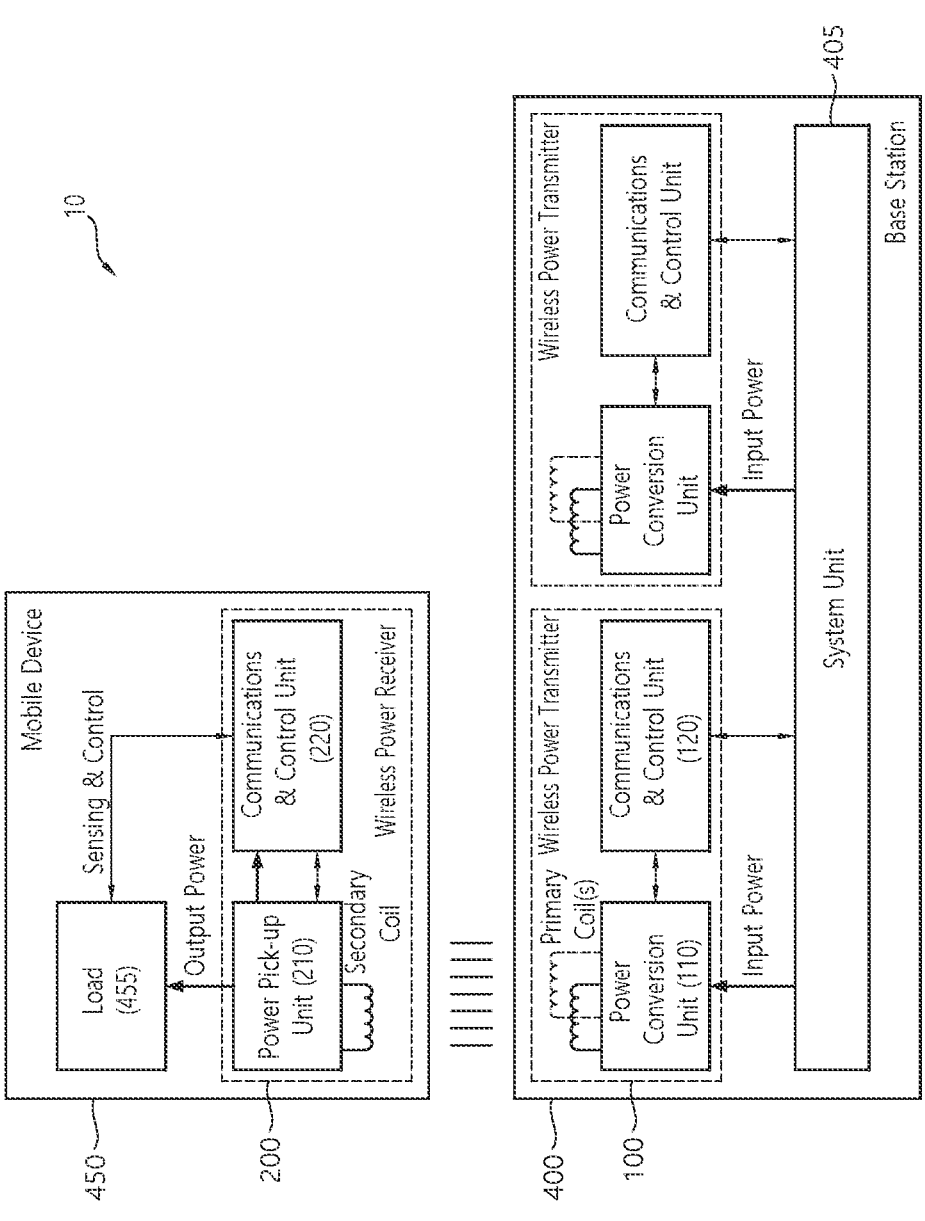
FIG. 4 is a block diagram of a wireless power transmission system according to one embodiment.

FIG. 4 is a block diagram of a wireless power transmission system according to one embodiment.

Referring to FIG. 4, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (IB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

Meanwhile, in the WPC system, the wireless power transmitter 100 may be classified, for example, in terms of power transmission amount. At this time, the wireless power transmitter 100 supporting a wireless power transmission amount of up to 5 W (i.e., the wireless power transmitter 100 supporting the BPP protocol) can be classified into, for example, type A wireless power transmitter 100 and type B wireless power transmitter 100, the wireless power transmitter 100 supporting a wireless power transmission amount of up to 15 W (i.e., the wireless power transmitter 100 supporting the EPP protocol) can be classified into, for example, type MP-A (MP-A) wireless power transmitter 100 and type MP-B (type MP-B) wireless power transmitter 100.

Type A and Type MP A wireless power transmitters (100)

Type A and Type MP A wireless power transmitters 100 may have one or more primary coils. Type A and Type MP A wireless power transmitters 100 activate a single primary coil at a time, so a single primary cell matching the activated primary coil can be used.

Type B and Type MP B wireless power transmitter (100)

Type B and Type MP B power transmitters may have a primary, coil array. And Type B and Type MP B power transmitters can enable free positioning. To this end, Type B and Type MP B power transmitters can activate one or more primary coils in the array to realize primary cells at different locations on the interface surface.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Meanwhile, although it is not shown in FIG. 4, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

When the communication/control circuit 120 and the communication/control circuit 220 are Bluetooth or Bluetooth LE as an OB communication module or a short-range communication module, the communication/control circuit 120 and the communication/control circuit 220 may each be implemented and operated with a communication architecture as shown in FIG. 5.

FIG. 5 is a diagram illustrating an example of a Bluetooth communication architecture to which an embodiment according to the present disclosure may be applied.

Referring to FIG. 5, (a) of FIG. 5 shows an example of a protocol stack of Bluetooth basic rate (BR)/enhanced data rate (EDR) supporting GATT, and (b) shows an example of Bluetooth low energy (BLE) protocol stack.

Specifically, as shown in (a) of FIG. 5, the Bluetooth BR/EDR protocol stack may include an upper control stack 460 and a lower host stack 470 based on a host controller interface (HCI) 18.

The host stack (or host module) 470 refers to hardware for transmitting or receiving a Bluetooth packet to or from a wireless transmission/reception module which receives a Bluetooth signal of 2.4 GHz, and the controller stack 460 is connected to the Bluetooth module to control the Bluetooth module and perform an operation.

The host stack 470 may include a BR/EDR PHY layer 12, a BR/EDR baseband layer 14, and a link manager layer 16.

The BR/EDR PHY layer 12 is a layer that transmits and receives a 2.4 GHz radio signal, and in the case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence for hopping 1400 times per second, and transmits a time slot with a length of 625 us for each channel.

The link manager layer 16 controls an overall operation (link setup, control, security) of Bluetooth connection by utilizing a link manager protocol (LMP).

The link manager layer 16 may perform the following functions.

Performs ACL/SCO logical transport, logical link setup, and control.

Detach: It interrupts connection and informs a counterpart device about a reason for the interruption.

Performs power control and role switch.

Performs security (authentication, pairing, encryption) function.

The host controller interface layer 18 provides an interface between a host module and a controller module so that a host provides commands and data to the controller and the controller provides events and data to the host.

The host stack (or host module, 470) includes a logical link control and adaptation protocol (L2CAP) 21, an attribute protocol 22, a generic attribute profile (GATT) 23, a generic access profile (GAP) 24, and a BR/EDR profile 25.

The logical link control and adaptation protocol (L2CAP) 21 may provide one bidirectional channel for transmitting data to a specific protocol or profile.

The L2CAP 21 may multiplex various protocols, profiles, etc., provided from upper Bluetooth.

L2CAP of Bluetooth BR/EDR uses dynamic channels, supports protocol service multiplexer, retransmission, streaming mode, and provides segmentation and reassembly, per-channel flow control, and error control.

The generic attribute profile (GATT) 23 may be operable as a protocol that describes how the attribute protocol 22 is used when services are configured. For example, the generic attribute profile 23 may be operable to specify how ATT attributes are grouped together into services and may be operable to describe features associated with services.

Accordingly, the generic attribute profile 23 and the attribute protocols (ATT) 22 may use features to describe device's state and services, how features are related to each other, and how they are used.

The attribute protocol 22 and the BR/EDR profile 25 define a service (profile) using Bluetooth BR/EDR and an application protocol for exchanging these data, and the generic access profile (GAP) 24 defines device discovery, connectivity, and security level.

As shown in (b) of FIG. 5, the Bluetooth LE protocol stack includes a controller stack 480 operable to process a wireless device interface important in timing and a host stack 490 operable to process high level data.

First, the controller stack 480 may be implemented using a communication module that may include a Bluetooth wireless device, for example, a processor module that may include a processing device such as a microprocessor.

The host stack 490 may be implemented as apart of an OS running on a processor module or as an instantiation of a package on the OS.

In some cases, the controller stack and the host stack may be run or executed on the same processing device in a processor module.

The controller stack 480 includes a physical layer (PHY) 32, a link layer 34, and a host controller interface 36.

The physical layer (PHY, wireless transmission/reception module) 32 is a layer that transmits and receives a 2.4 GHz radio signal and uses Gaussian frequency shift keying (GFSK) modulation and a frequency hopping scheme including 40 RF channels.

The link layer 34, which serves to transmit or receive Bluetooth packets, creates connections between devices after performing advertising and scanning functions using 3 advertising channels and provides a function of exchanging data packets of up to 257 bytes through 37 data channels.

The host stack includes a generic access profile (GAP) 45, a logical link control and adaptation protocol (L2CAP, 41), a security manager (SM) 42, and an attribute protocol (ATT) 43, a generic attribute profile (GATT) 44, a generic access profile 45, and an LE profile 46. However, the host stack 490 is not limited thereto and may include various protocols and profiles.

The host stack multiplexes various protocols, profiles, etc., provided from upper Bluetooth using L2CAP.

First, the logical link control and adaptation protocol (L2CAP) 41 may provide one bidirectional channel for transmitting data to a specific protocol or profile.

The L2CAP 41 may be operable to multiplex data between higher layer protocols, segment and reassemble packages, and manage multicast data transmission.

In Bluetooth LE, three fixed channels (one for signaling CH, one for security manager, and one for attribute protocol) are basically used. Also, a dynamic channel may be used as needed.

Meanwhile, a basic channel/enhanced data rate (BR/EDR) uses a dynamic channel and supports protocol service multiplexer, retransmission, streaming mode, and the like.

The security manager (SM) 42 is a protocol for authenticating devices and providing key distribution.

The attribute protocol (ATT) 43 defines a rule for accessing data of a counterpart device in a server-client structure. The ATT has the following 6 message types (request, response, command, notification, indication, confirmation).

① Request and Response message: A request message is a message for requesting specific information from the client device to the server device, and the response message is a response message to the request message, which is a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

①  Service: It defines a basic operation of a device by a combination of behaviors related to data ②  Include: It defines a relationship between services ③  Characteristics: It is a data value used in a server ④  Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

①  Battery: Battery information exchanging method

②  Time: Time information exchanging method

③  FindMe: Provision of alarm service according to distance

④  Proximity: Battery information exchanging method

⑤  Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an supplemental information request or a connection request.

In contrast, directed advertising may make an supplemental information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related supplemental information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in the present disclosure.

Referring to FIG. 4, the load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Figure 6:
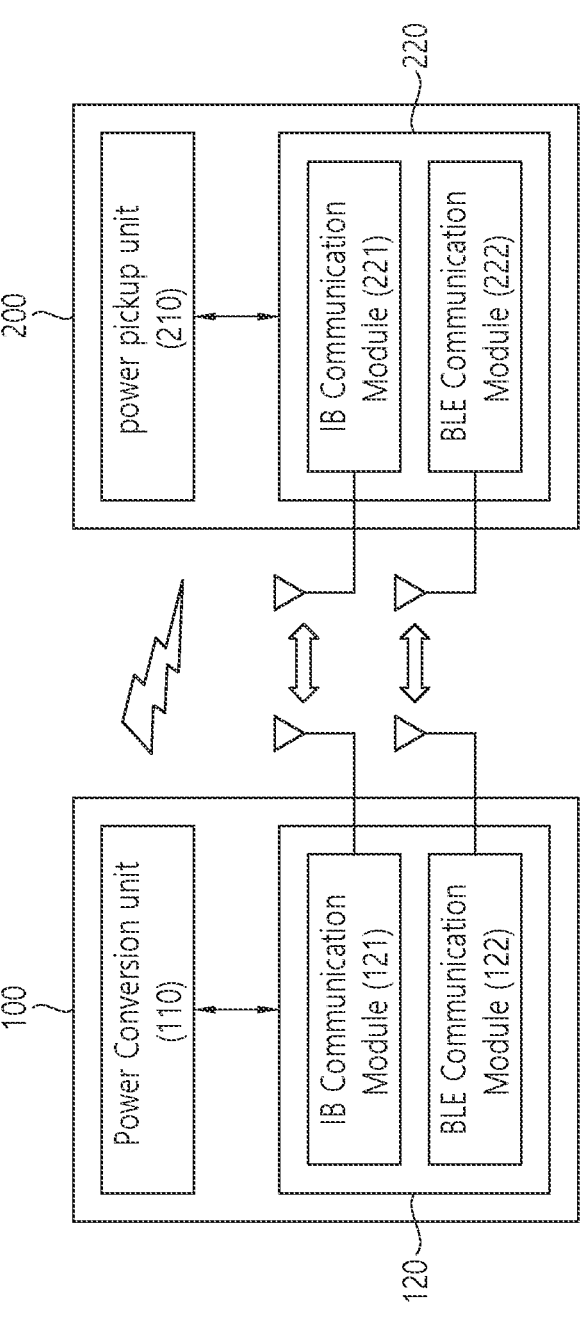
FIG. 6 is a block diagram illustrating a wireless power transfer system using BLE communication according to an example.

When the communication/control circuit 120 and the communication/control circuit 220 include Bluetooth or Bluetooth LE as an OB communication module or a short-range communication module in addition to the IB communication module, the wireless power transmitter 100 including the communication/control circuit 120 and the wireless power receiver 200 including the communication/control circuit 220 may be represented by a simplified block diagram as shown in FIG. 6.

FIG. 6 is a block diagram illustrating a wireless power transfer system using BLE communication according to an example.

Referring to FIG. 6, the wireless power transmitter 100 includes a power conversion circuit 110 and a communication/control circuit 120. The communication/control circuit 120 includes an in-band communication module 121 and a BLE communication module 122.

Meanwhile, the wireless power receiver 200 includes a power pickup circuit 210 and a communication/control circuit 220. The communication/control circuit 220 includes an in-band communication module 221 and a BLE communication module 222.

In one aspect, the BLE communication modules 122 and 222 perform the architecture and operation according to FIG. 5. For example, the BLE communication modules 122 and 222 may be used to establish a connection between the wireless power transmitter 100 and the wireless power receiver 200 and exchange control information and packets necessary for wireless power transfer.

In another aspect, the communication/control circuit 120 may be configured to operate a profile for wireless charging. Here, the profile for wireless charging may be GATT using BLE transmission.

Figure 7:
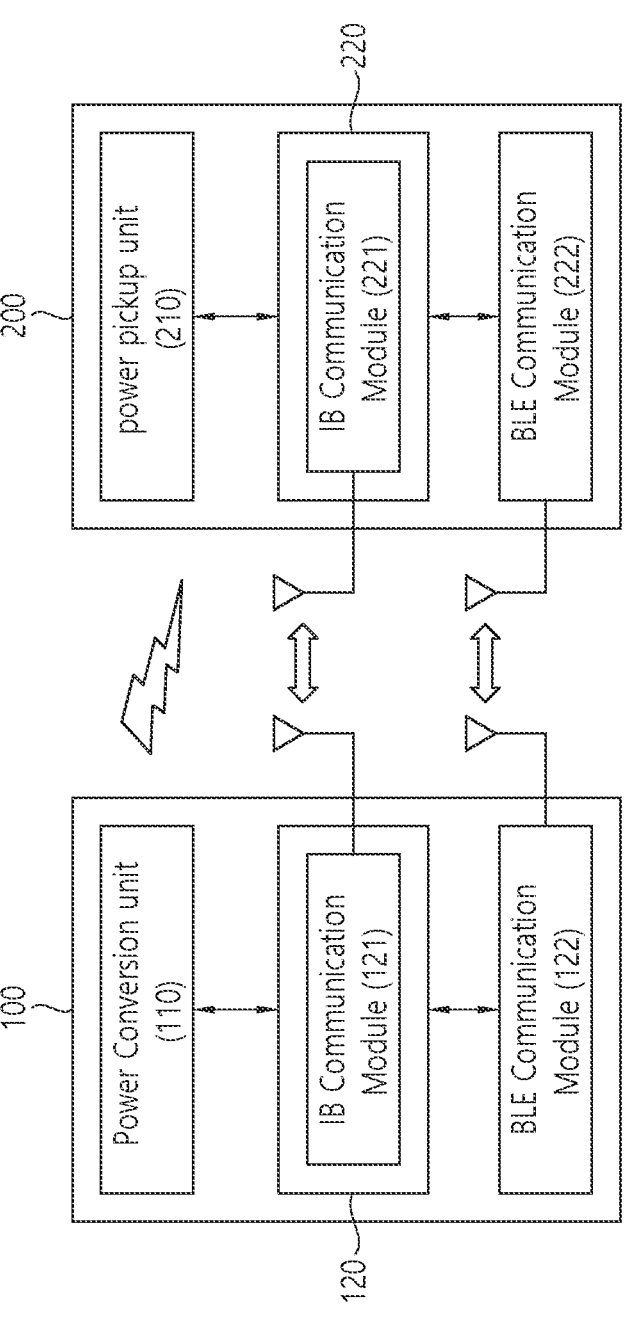
FIG. 7 is a block diagram illustrating a wireless power transfer system using BLE communication according to another example.

FIG. 7 is a block diagram illustrating a wireless power transfer system using BLE communication according to another example.

Referring to FIG. 7, the communication/control circuits 120 and 220 respectively include only in-band communication modules 121 and 221, and the BLE communication modules 122 and 222 may be provided to be separated from the communication/control circuits 120 and 220.

Hereinafter, the coil or coil unit includes a coil and at least one device being approximate to the coil, and the coil or coil unit may also be referred to as a coil assembly, a coil cell, or a cell.

Meanwhile, when the user places the wireless power receiver 200 within the operating volume of the wireless power transmitter 100, the wireless power transmitter 100 and the wireless power receiver 200 begin communication for the purpose of configuring and controlling power transmission. At this time, the power signal can provide a carrier for all communications, and the protocol for communication can be composed of several steps. Hereinafter, the communication protocol will be described.

Figure 8:
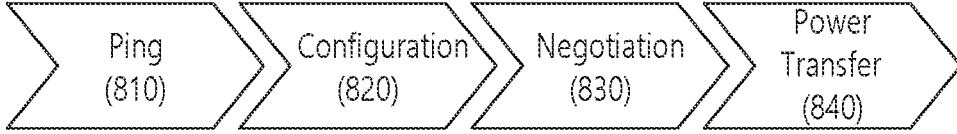
FIG. 8 is a state transition diagram for explaining the wireless power transfer procedure.

FIG. 8 is a state transition diagram for explaining the wireless power transfer procedure.

WPC can define two communication protocols.

Baseline Protocol (or BPP): May refer to an original protocol that supports only one-way communication from the wireless power receiver 200 to the wireless power transmitter 100.

Extended Protocol (or EPP): Supports two-way communication and improved foreign object detection (FOD) functions, and can also support data transport stream functions and authentication options.

Referring to FIG. 8, the power transfer operation between the wireless power transmitter 100 and the wireless power receiver 200 according to an embodiment of the present specification can be largely divided into a ping phase (810), a configuration phase (820), a negotiation phase (830), and a power transfer phase.

Ping Phase (810)

In the ping phase 810, the wireless power transmitter 100 may attempt to establish communication with the wireless power receiver 200. Before attempting to establish communication, measurements may be performed to determine whether there are objects such as bank cards, coins or other metals that may be damaged or heated during power transfer. Here, these measurements can be performed without waking up the wireless power receiver 200.

Here, after obtaining design information from the wireless power receiver 200, the wireless power transmitter 100 may postpone a conclusion about whether the detected metal is a foreign object or a friendly metal to the negotiation phase 830.

Configuration Phase (820)

In the configuration phase 820, the wireless power receiver 200 may send basic identification and configuration data to the wireless power receiver 200. And, both the wireless power transmitter 100 and the wireless power receiver 200 can use this information to create a baseline power transfer contract.

Additionally, the wireless power transmitter 100 and the wireless power receiver 200 may determine whether to continue the baseline protocol or the extended protocol in the configuration phase 820.

Here, the wireless power receiver 200 can use functions such as enhanced FOD, data transport stream, and authentication only when implementing the extended protocol.

Negotiation Phase (830)

In the negotiation phase 830, the wireless power transmitter 100 and the wireless power receiver 200 may establish an extended power transfer contract that includes additional settings and restrictions. Additionally, the wireless power receiver 200 may provide design information to the wireless power transmitter 100. Later, the design information can be used to complete the FOD before transitioning to the power transfer phase 840.

Here, the negotiation phase 830 may correspond to a step that does not exist in the baseline protocol.

Power Transfer Phase (840)

The power transfer phase 840 may be a step in which power is transferred to the load of the wireless power receiver 200.

In the extended protocol, the wireless power transmitter 100 and the wireless power receiver 200 may perform system calibration when this step begins. This stage may occasionally be interrupted to renegotiate elements of the power transfer contract. However, power transfer may continue even during this renegotiation.

Below, as previously explained, each protocol for Ping Phase 810, Configuration Phase 820, Negotiation Phase 830, and Power Transfer Phase 840 will be explained in more detail.

1. Ping Phase (810)

When the ping phase 810 begins, the wireless power transmitter 100 does not yet know whether the wireless power receiver 200 is within the operating volume. In addition, the wireless power receiver 200 cannot recognize the wireless power receiver 200. For that reason, this system is usually disabled due to lack of power signal.

In this situation, before the wireless power transmitter 100 starts a digital ping to request a response from the wireless power receiver 200, the wireless power transmitter 100 may go through the following steps.

Figure 9:
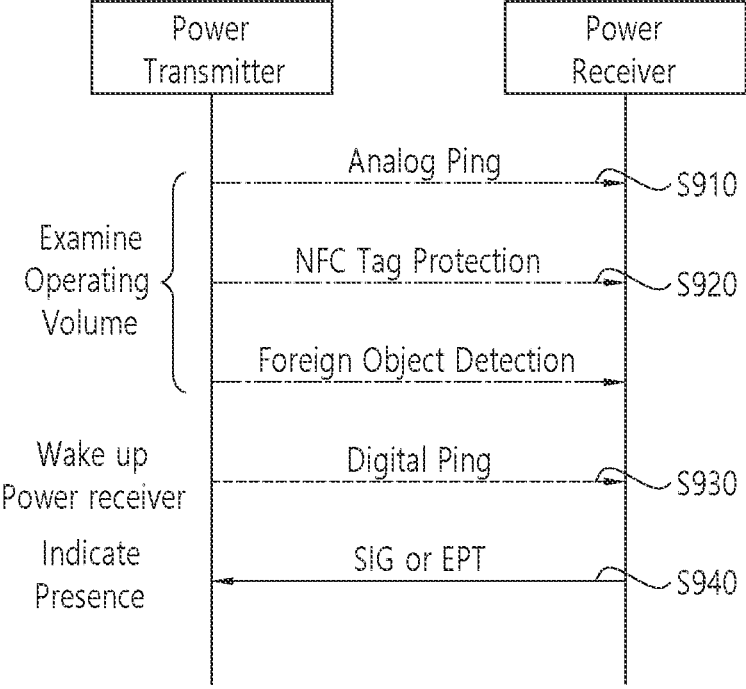
FIG. 9 schematically shows an example of the protocol of the ping phase 810.

FIG. 9 schematically shows an example of the protocol of the ping phase 810.

According to FIG. 9, the wireless power transmitter 100 can perform analog ping (S910). That is, the wireless power transmitter 100 can confirm whether an object exists in the operating volume by transmitting an analog ping. For example, a wireless power transmitter can detect whether an object exists in the operating space based on a change in current in the transmission coil or primary coil.

The wireless power transmitter 100 may apply NFC tag protection (S920). Here, NFC tag protection can be performed through the following procedures.

a) First, it can be confirmed whether one or more of the detected objects include an NFC tag.

b) Afterwards, it can be checked whether the object containing the NFC tag can withstand the power signal without damage.

c) If the wireless power transmitter 100 determines that the NFC tag cannot withstand the power signal, it does not start digital ping and maintains the ping phase, the wireless power transmitter 100 can inform the user of the reason why it cannot proceed.

The wireless power transmitter 100 may perform foreign object detection (S930). That is, the wireless power transmitter 100 can collect information helpful in determining whether there is a foreign object other than the wireless power receiver 200. For this purpose, the wireless power transmitter 100 can use various methods such as a pre-power FOD method.

Meanwhile, in the three steps (S910, S920, and S930) described above, the radio power receiver may not operate.

If the wireless power transmitter 100 performs the above steps and determines that the wireless power receiver 200 is potentially present in the operating volume, the wireless power transmitter 100 may start a digital ping (S940). Here, the digital ping may request a response such as a signal strength (SIG) data packet or an end power transfer (EPT) data packet from the wireless power receiver 200.

Thereafter, the wireless power transmitter 100 may receive the SIG or EPT from the wireless power receiver 200 (S950). Here, the SIG data packet may provide a measure of coupling, and the SIG data packet may include information about signal strength values. Additionally, the EPT data packet may provide a request to stop power transmission and a reason for the request.

If the wireless power transmitter 100 does not receive the above response from the wireless power receiver 200, the wireless power transmitter 100 may repeat the above steps while remaining in the ping phase 810.

2. Configuration Phase (820)

The configuration phase 820 is part of the following protocol.

The wireless power receiver 200 can identify itself to the wireless power transmitter 100.

The wireless power receiver 200 and the wireless power transmitter 100 can establish a baseline power transfer contract.

The wireless power receiver 200 and the wireless power transmitter 100 can determine the protocol variant to be used for power transmission.

In the configuration phase 820, the wireless power transmitter 100 and the wireless power receiver 200 may continue to operate using the digital ping parameter. This may mean that the power and current levels of both the wireless power transmitter 100 and the wireless power receiver 200 change only when the user moves the wireless power receiver 200 from position within the operating volume.

Hereinafter, the protocol in the configuration phase 820 will be described in more detail.

Figures 10, 11:
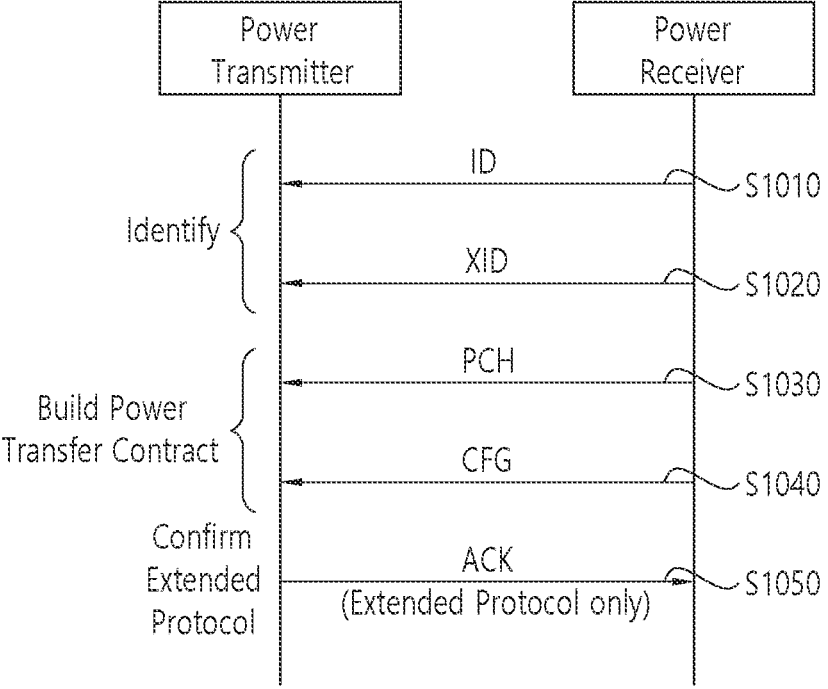
FIG. 10 schematically shows an example of the protocol of the configuration phase 820.
FIG. 11 is a diagram illustrating a message field of a configuration packet (CFG) of a wireless power reception device according to an embodiment.

FIG. 10 schematically shows an example of the protocol of the configuration phase 820.

According to FIG. 10, the wireless power transmitter 100 may receive an identification (ID) from the wireless power receiver 200 (S1010). Alternatively, the wireless power transmitter 100 may also receive an extended identification (XID) from the wireless power receiver 200 (S1020). That is, the wireless power receiver 200 may identify itself using an ID data packet and, optionally, an XID data packet.

The wireless power transmitter 100 may selectively receive a power control hold-off (PCH) data packet from the wireless power receiver 200 (S1030), the wireless power transmitter 100 may receive a CFG data packet from the wireless power receiver 200 (S1040). That is, the wireless power receiver 200 can provide data for use in a power transfer contract using PCH and/or CFG data packets.

Finally, the wireless power transmitter 100 can check the extended protocol if possible (S1050).

Each data packet described above can be summarized as follows.

ID: The ID data packet may be information that identifies the wireless power receiver 200. Here, the ID may include a manufacturer code, basic device identifier, etc. In addition, the ID may also include information that identifies the presence or absence of an XID data packet in the setup phase.

XID: XID data packets may contain additional identification data.

PCH: The PCH data packet may configure the delay between the reception of the CE data packet and the wireless power transmitter 100 starting coil current adjustment.

CFG: CFG data packets can provide basic configuration data.

For example, a CFG data packet can provide all parameters governing power transfer in the baseline protocol. In addition, CFG data packets can provide all FSK communication parameters used in the extended protocol. Additionally, CFG data packets may provide additional functions of the wireless power receiver 200.

FIG. 11 is a diagram illustrating a message field of a configuration packet (CFG) of a wireless power reception device according to an embodiment.

According to FIG. 11, the configuration packet (CFG) according to one embodiment may have a header value of 0x51, and the message field of the configuration packet (CFG) may include a 1-bit authentication (AI) flag and a 1-bit outband (OB) flag.

The authentication flag (AI) indicates whether the wireless power receiving device supports the authentication function. For example, if the value of the authentication flag (AI) is '1', it indicates that the wireless power receiving device supports the authentication function or can operate as an authentication initiator, if the value of the authentication flag (AI) is '0', it may indicate that the wireless power receiving device does not support the authentication function or cannot operate as an authentication initiator.

The out-of-band (OB) flag indicates whether the wireless power receiving device supports out-of-band communication. For example, if the value of the out-of-band (OB) flag is '1', the wireless power receiver indicates out-of-band communication, if the value of the outband (OB) flag is '0', it may indicate that the wireless power receiving device does not support outband communication.

Provision of the ID and/or XID described above is for identification purposes. Additionally, the provision of PCH and/or CFG is for the construction of a power transfer contract.

3. Negotiation Phase (830)

The negotiation phase 830 is part of an extended protocol that allows the wireless power transmitter 100 and the wireless power receiver 200 to change the power transfer contract. There are two types of this stage.

Negotiation phase (830): The negotiation phase (830) directly follows the configuration phase (820) and serves to create an initial extended power transfer contract. In addition, the negotiation phase 830 also serves to complete the pre-power FOD function. Here, the length of the negotiation phase is not limited.

Renegotiation phase: The renegotiation phase can interrupt the power transfer phase (840) multiple times and generally serves to adjust a single element of the power transfer contract. In addition, FOD/qf, FOD/rf, and SRQ/rpr data packets may not be used in the renegotiation phase. Constraints on CE data packets in the power transfer phase 840 limit the length of the renegotiation phase.

In the negotiation or renegotiation phase, the power transfer contract related to the reception/transmission of wireless power between a wireless power receiving device and a wireless power transmitting device is expanded or changed, or a renewal of the power transfer contract is made that adjusts at least some of the elements of the power transfer contract, or information may be exchanged to establish out-of-band communication.

Figure 12:
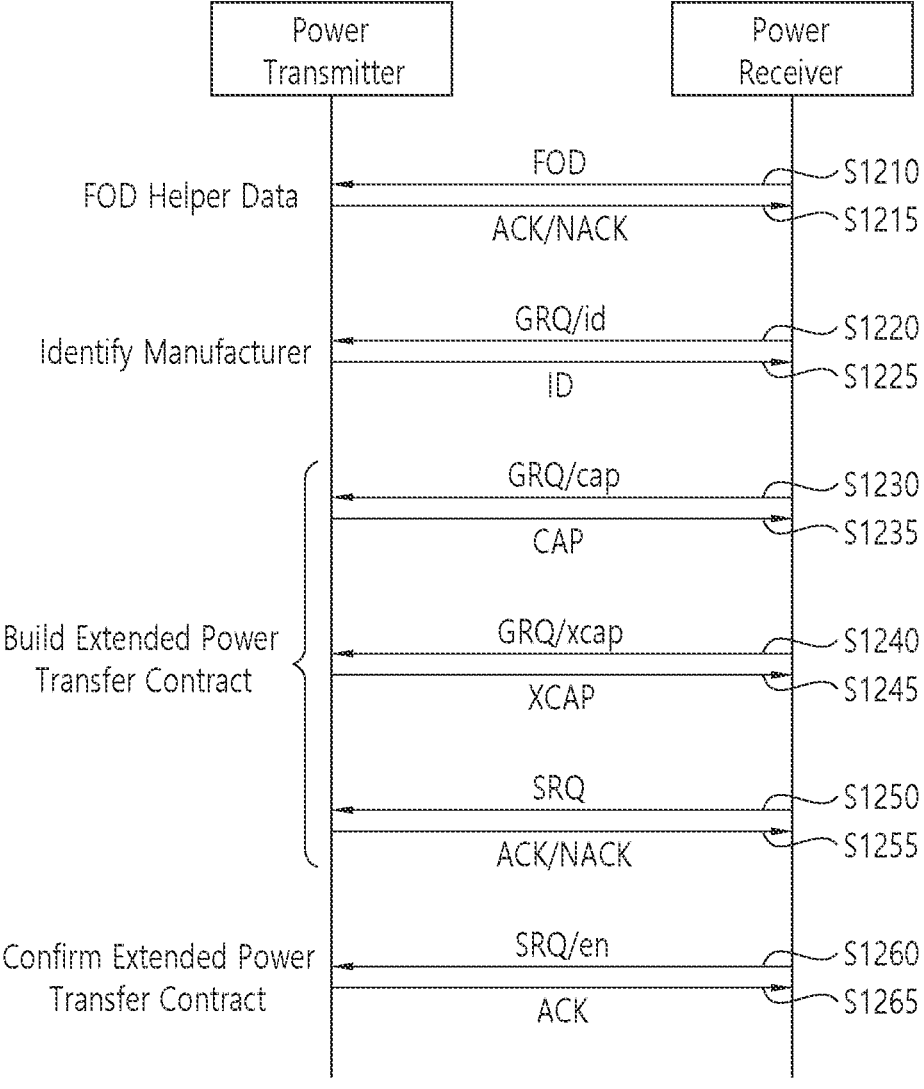
FIG. 12 is a flowchart schematically illustrating a protocol of a negotiation stage or a renegotiation stage according to an embodiment.

FIG. 12 is a flowchart schematically illustrating a protocol of a negotiation stage or a renegotiation stage according to an embodiment.

Referring to FIG. 12, the wireless power transmitter 100 may receive a FOD status data packet (e.g. FOD) from the wireless power receiver 200 (S1210). Here, the wireless power receiver 200 can use the FOD status data packet to inform the wireless power transmitter 100 of the effect its presence has on selected properties of the reference wireless power transmitter 100. And, the wireless power transmitter 100 can configure the FOD function using this information.

The wireless power transmitter 100 may transmit an ACK/NAK for the FOD status data packet to the wireless power receiver 200 (S1215).

Meanwhile, the wireless power receiver 200 may receive an identification data packet (ID), a capabilities data packet (CAP), and an extended CAP (XCAP) of the wireless power transmitter 100 using a general request data packet (GRQ).

The general request packet (GRQ) may have a header value of 0x07 and may include a 1-byte message field. The message field of the general request packet (GRQ) may include a header value of a data packet that the wireless power receiver 200 requests from the wireless power transmitter 100 using the GRQ packet.

For example, in the negotiation phase or renegotiation phase, the wireless power receiver 200 may transmit a GRQ packet (GRQ/id) requesting an ID packet of the wireless power transmitter 100 to the wireless power transmitter 100 (S1220).

The wireless power transmitter 100 that has received the GRQ/id may transmit an ID packet to the wireless power receiver 200 (S1225). The ID packet of the wireless power transmitter 100 includes information about the 'Manufacturer Code'. The ID packet containing information about the 'Manufacturer Code' allows the manufacturer of the wireless power transmitter 100 to be identified.

Or, in the negotiation phase or re-negotiation phase, the wireless power receiver 200 may transmit a GRQ packet (GRQ/cap) requesting a capability packet (CAP) of the wireless power transmitter 100 to the wireless power transmitter 100 (S1230). The message field of GRQ/cap may include the header value (0x31) of the capability packet (CAP).

The wireless power transmitter 100 that has received the GRQ/cap may transmit a capability packet (CAP) to the wireless power receiver 200 (S1235).

Or, in the negotiation phase or re-negotiation phase, the wireless power receiver 200 may transmit a GRQ packet (GRQ/xcap) requesting a capability packet (CAP) of the wireless power transmitter 100 to the wireless power transmitter 100 (S1240). The message field of GRQ/xcap may include the header value (0x32) of the performance packet (XCAP).

The wireless power transmitter 100 that has received GRQ/xcap may transmit a capability packet (XCAP) to the wireless power receiver 200 (S1245).

Figures 13, 14:
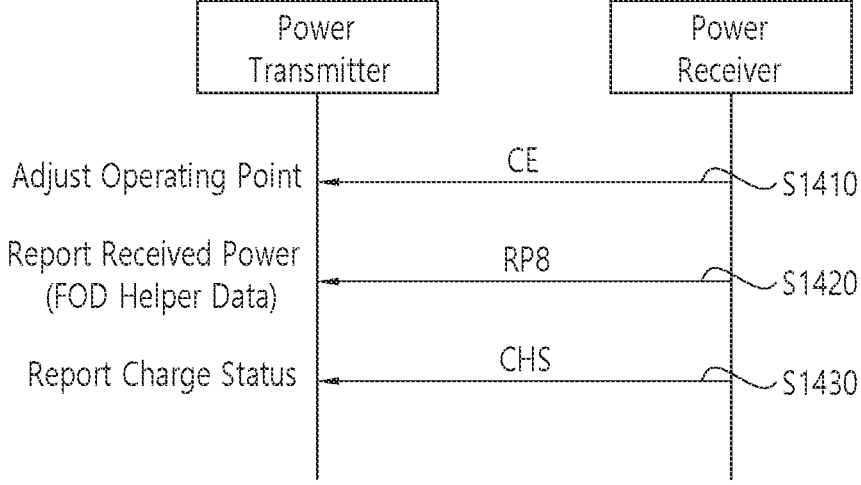
FIG. 13 is a diagram illustrating a message field of a capability packet (CAP) of a wireless power transmission device according to an embodiment.
FIG. 14 schematically shows a flow chart of the data flow for the power transfer phase 840 in the baseline protocol.

FIG. 13 is a diagram illustrating a message field of a capability packet (CAP) of a wireless power transmission device according to an embodiment.

A capability packet (CAP) according to one embodiment may have a header value of 0x31 and, referring to FIG. 13, may include a 3-byte message field.

Referring to FIG. 13, the message field of the capability packet (CAP) may include a 1-bit authentication (AR) flag and a 1-bit outband (OB) flag.

The authentication flag (AR) indicates whether the wireless power transmitter 100 supports the authentication function. For example, if the value of the authentication flag (AR) is '1', it indicates that the wireless power transmitter 100 supports an authentication function or can operate as an authentication responder, if the value of the authentication flag (AR) is '0', it may indicate that the wireless power transmitter 100 does not support the authentication function or cannot operate as an authentication responder.

The outband (OB) flag indicates whether the wireless power transmitter 100 supports outband communication. For example, if the value of the outband (OB) flag is '1', the wireless power transmitter 100 instructs outband communication, if the value of the out-of-band (OB) flag is '0', this may indicate that the wireless power transmitter 100 does not support out-of-band communication.

In the negotiation phase, the wireless power receiver 200 can receive the capability packet (CAP) of the wireless power transmitter 100 and check whether the wireless power transmitter 100 supports the authentication function and whether out-band communication is supported.

Returning to FIG. 12, the wireless power receiver 200 can update the elements of the power transfer contract (Power Transfer Contract) related to the power to be provided in the power transfer phase using at least one specific request packet (SRQ, Specific Request data packet) in the negotiation phase or re-negotiation phase (S1250), ACK/NAK for this can be received (S1255).

Meanwhile, in order to confirm the extended power transfer contract and end the negotiation phase, the wireless power receiver 200 transmits SRQ/en to the wireless power transmitter 100 (S1260), it can receive ACK from the wireless power transmitter 100 (S1265).

4. Power Transfer Phase (840)

The power transfer phase 840 is a part of the protocol in which actual power is transferred to the load of the wireless power receiver 200. Here, power transfer may proceed according to the conditions of the power transfer contract created in the negotiation phase 830.

<Power Control Based on CE>

The wireless power receiver 200 can control the power level by transmitting control error (CE) data that measures the deviation between the target and the actual operating point of the wireless power receiver 200 to the wireless power transmitter 100. The wireless power transmitter 100 and wireless power receiver 200 aim to make the control error data zero, at which point the system will operate at the target power level.

<In-Power Transfer FOD Method> in addition to control error data, the wireless power transmitter 100 and the wireless power receiver 200 may exchange information to facilitate FOD. The wireless power receiver 200 regularly reports the amount of power it receives (received power level) to the wireless power transmitter 100, the wireless power transmitter 100 may inform the wireless power receiver 200 whether a foreign object has been detected. Methods that can be used for FOD in the power transfer phase may correspond to, for example, power loss calculations. In this approach, the wireless power transmitter 100 compares the received power level reported by the wireless power receiver 200 with the amount of transmitted power (transmitted power level) and it can send a signal (whether a foreign object has been monitored) to the wireless power receiver 200 when the difference exceeds a threshold.

<Renegotiation Phase>

If necessary depending on the situation, the wireless power transmitter 100 or the wireless power receiver 200 may request renegotiation of the power transfer contract during the power transfer phase. Examples of changed circumstances in which renegotiation of a power transfer contract may occur include:

When the wireless power receiver 200 requires (substantially) more power than previously negotiated.

When the wireless power transmitter 100 detects that it is operating at low efficiency.

When the wireless power transmitter 100 can no longer maintain its current power level due to increased operating temperature (Or vice versa, i.e., when the wireless power receiver 200 can operate at a higher power level after sufficiently cooling).

Here, an example of a specific protocol for the renegotiation phase is the same as described above.

<Data Transport Strenm>

The wireless power transmitter 100 and the wireless power receiver 200 may start a data transport stream and exchange application level data throughout the power transfer phase 840.

Here, an important common application is authentication, where each side can verify the other's credentials in a tamper-proof manner. For example, the wireless power receiver 200 may want to check the credentials of the wireless power transmitter 100 to ensure that the wireless power transmitter 100 can be trusted to operate safely at high power levels. Having the appropriate credentials can mean you have passed compliance testing.

Accordingly, the present specification may provide a method of starting power transfer at a low power level and controlling power to a higher power level only after successfully completing the authentication protocol.

<Protocol in Power Transfer Phase 840>

So far, the operation between the wireless power transmitter 100 and the wireless power receiver 200 in the power transfer phase 840 has been briefly described. Hereinafter, for a smooth understanding of the operation in the power transfer phase 840, the protocol in the power transfer phase 840 will be described separately as a baseline protocol and an extended protocol.

FIG. 14 schematically shows a flow chart of the data flow for the power transfer phase 840 in the baseline protocol.

According to FIG. 14, the wireless power receiver 200 may transmit CE to the wireless power transmitter 100 (S1410). Here, the wireless power receiver 200 can generally transmit CE data packets several times per second.

The wireless power receiver 200 may generally transmit a received power (RP) data packet (RP8 in the baseline protocol) to the wireless power transmitter 100 once every 1.5 seconds (S1420).

Optionally, the wireless power receiver 200 may transmit a charge status (CHS) data packet to the wireless power transmitter 100 (S1430).

The data packet described above can be summarized and explained as follows.

CE: CE data packets can provide feedback on the desired power level. CE data packets may include a control error value, here, the control error value may be a signed integer value that is a relative measurement value of the deviation between the actual operating point and the target operating point of the wireless power receiver 200. If the control error value at this time is a positive value, it indicates that the actual operating point is below the target operating point, the wireless power transmitter 100 may be requested to increase the power signal. If the control error value is a negative value, it indicates that the actual operating point is above the target operating point, the wireless power transmitter 100 may be requested to reduce the power signal.

RP8: RP8 data packets can report the received power level. Here, RP8 data packets can only be included in the baseline protocol.

CHS: CHS data packets can provide the charge level of the battery at the load.

Figure 15:
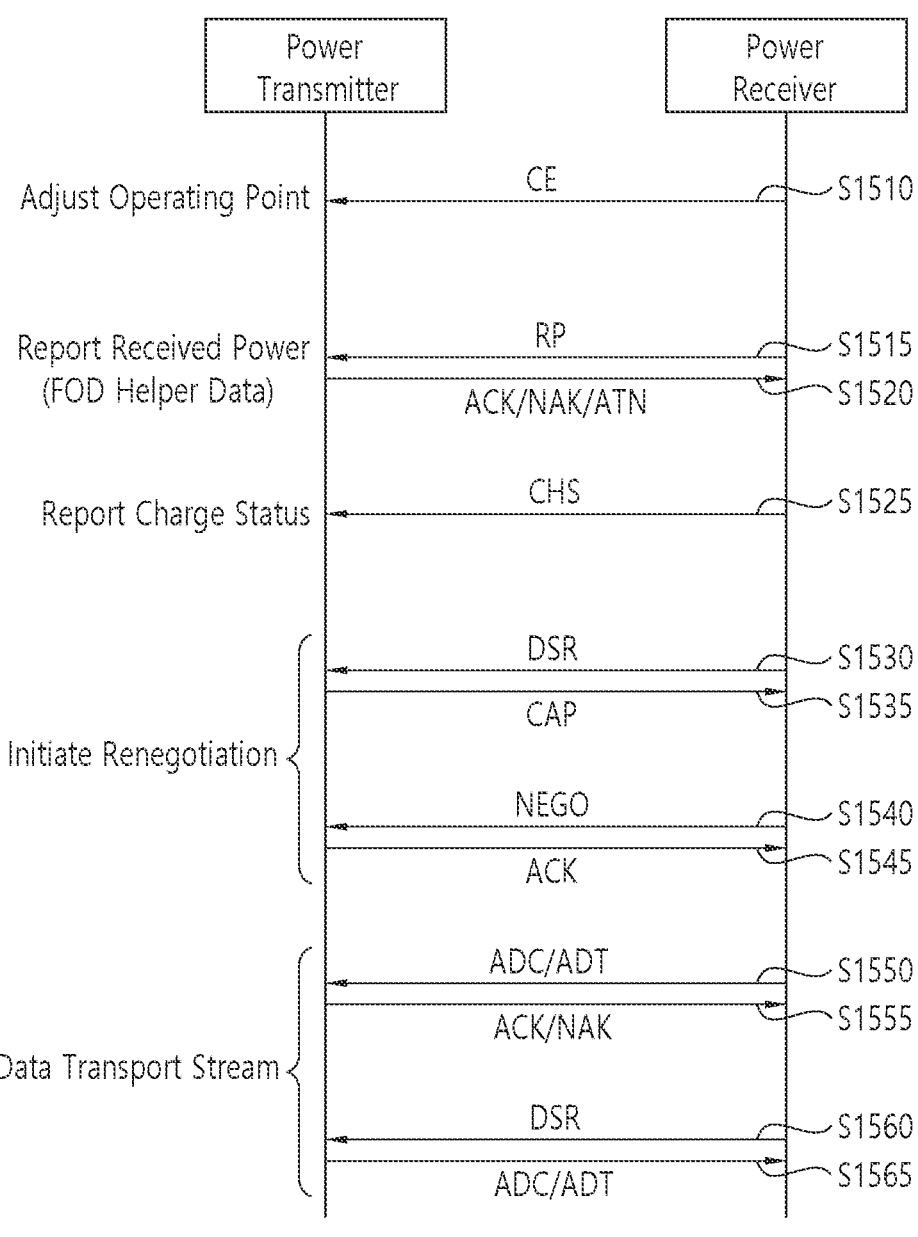
FIG. 15 schematically shows a flow chart of the data flow for the power transfer phase 840 in the extended protocol.

FIG. 15 schematically shows a flow chart of the data flow for the power transfer phase 840 in the extended protocol.

According to FIG. 15, the wireless power receiver 200 may transmit CE to the wireless power transmitter 100 (S1510). Here, the wireless power receiver 200 can generally transmit CE data packets several times per second.

The wireless power receiver 200 may generally transmit a received power (RP) data packet (RP in the extended protocol) to the wireless power transmitter 100 once every 1.5 seconds (S1515).

In the power transfer phase, control error packets (CE) and received power packets (RP) are data packets that must be repeatedly transmitted/received according to the required timing constraints to control wireless power.

The wireless power transmitter 100 can control the level of wireless power transmitted based on the control error packet (CE) and received power packet (RP) received from the wireless power receiver 200.

Meanwhile, in the extended protocol, the wireless power transmitter 100 may respond to the received power packet (RP) with a bit pattern such as ACK, NAK, or ATN (S1520).

The fact that the wireless power transmitter 100 responds with ACK to a received power packet (RP/0) with a mode value of 0 means that power transmission can continue at the current level.

When the wireless power transmitter 100 responds with NAK to a received power packet (RP/0) with a mode value of 0, this means that the wireless power receiver 200 must reduce power consumption.

For received power packets with a mode value of 1 or 2 (RP/1 or RP/2), when the wireless power transmitter 100 responds with ACK, this means that the wireless power receiver 200 has accepted the power correction value included in the received power packet (RP/1 or RP/2).

For received power packets with a mode value of 1 or 2 (RP/1 or RP/2), when the wireless power transmitter 100 responds with NAK, it means that the wireless power receiver 200 did not accept the power correction value included in the received power packet (RP/1 or RP/2).

The received power packet (RP/1) with a mode value of 1 described above may mean the first calibration data point, a received power packet (RP/2) with a mode value of 2 may mean an additional calibration data point. Here, the wireless power receiver may transmit a received power packet (RP/2) with a mode value of 2 to the wireless power transmitter multiple times to transmit a plurality of additional power calibration values, the wireless power transmitter can proceed with a calibration procedure based on the received RP/I and multiple RP/2.

When the wireless power transmitter 100 responds with ATN to the received power packet (RP), it means that the wireless power transmitter 100 requests permission for communication. That is, the wireless power transmitter 100 may transmit an attention (ATN) response pattern to request permission to transmit a data packet in response to an RP data packet. In other words, the wireless power transmitter 100 may transmit an ATN to the wireless power receiver 200 in response to the RP data packet and request the wireless power receiver 200 for permission to transmit the data packet.

Optionally, the wireless power receiver 200 may transmit a charge status (CHS) data packet to the wireless power transmitter 100 (S1525).

Meanwhile, the wireless power transmitter 100 and the wireless power receiver 200 can exchange data stream response (DSR) data packets, CAP data packets, and NEGO data packets to initiate renegotiation of elements of the power transfer contract (typically guaranteed load power).

For example, the wireless power receiver 200 transmits a DSR data packet to the wireless power transmitter 100 (S1530), the wireless power transmitter 100 may transmit a CAP to the wireless power receiver 200 (S1535).

In addition, the wireless power receiver 200 transmits a NEGO data packet to the wireless power transmitter 100 (S1540), the wireless power transmitter 100 may transmit an ACK to the wireless power receiver 200 in response to the NEGO data packet (S1545).

Here, the data packets related to the start of the renegotiation phase can be summarized as follows.

DSR: Any one of the following values can be set in the DSR data packet.

i) 0x00-DSR/nak: Indicates that the last received data packet of the wireless power transmitter 100 was rejected.

ii) 0x33-DSR/poll: Invite the wireless power transmitter 100 to send a data packet.

iii) 0x55-DSR/nd: Indicates that the last received data packet from the wireless power transmitter 100 was not expected.

iv) 0xFF-DSR/ack: Confirms that the last received data packet of the wireless power transmitter 100 has been properly processed.

CAP: The CAP data packet provides information about the function of the wireless power transmitter 100. The specific details are the same as described previously.

NEGO: NEGO data packets may request the wireless power transmitter 100 to proceed to the re-negotiation phase.

The wireless power transmitter 100 and the wireless power receiver 200 may use auxiliary data transport (ADC), auxiliary data transport (ADT), and DSR data packets to exchange application level data.

That is, from the perspective of transmission and reception of a data transport stream for exchange of application-level data, the wireless power receiver 200 may transmit ADC/ADT to the wireless power transmitter 100 (S1550), the wireless power transmitter 100 may transmit an ACK/NAK to the wireless power receiver 200 in response (S1555). In addition, the wireless power receiver 200 can transmit DSR to the wireless power transmitter 100 (S1560), the wireless power transmitter may transmit ADC/ADT to the wireless power receiver (S1565).

Here, the data transport stream serves to transfer application-level data from the data stream initiator to the data stream responder. Additionally, application level data can be broadly divided into i) authentication applications, and ii) proprietary (general purpose) applications.

Among application level data, messages/information related to the authentication application can be organized as follows.

The message used in the authentication procedure is called an authentication message. Authentication messages are used to convey information related to authentication. There are two types of authentication messages. One is an authentication request, and the other is an authentication response. An authentication request is sent by an authentication initiator, and an authentication response is sent by an authentication responder. The wireless power transmitting device and receiving device can be an authentication initiator or an authentication responder. For example, if the wireless power transmitting device is the authentication initiator, the wireless power receiving device becomes the authentication responder, and if the wireless power receiving device is the authentication initiator, the wireless power transmitting device becomes the authentication responder.

Authentication request messages include GET_DIGESTS, GET_CERTIFICATE, and CHALLENGE.

GET_DIGESTS: This request can be used to retrieve certificate chain digests. The wireless power receiver 200 can request a desired number of digests at a time.

GET_CERTIFICATE: This request can be used to read segments of the target certificate chain.

CHALLENGE: This request can be used to initiate authentication of a power transmitter product device.

The authentication response message includes DIGESTS, CERTIFICATE, CHALLENGE_AUTH, and ERROR.

DIGESTS: The wireless power transmitter 100 can send a certificate chain summary using the DIGESTS response and report slots containing a valid certificate chain summary.

CERTIFICATE: This response can be used by the wireless power transmitter 100 to send the requested segment of the certificate chain.

CHALLENGE_AUTH: The wireless power transmitter 100 can respond to the CHALLENGE request using CHALLENGE_AUTH.

ERROR: This response can be used to transmit error information from the power transmitter.

The authentication message may be called an authentication packet, authentication data, or authentication control information. Additionally, messages such as GET_DIGEST and DIGESTS may also be called GET_DIGEST packets, DIGEST packets, etc.

Meanwhile, as described above, the wireless power receiver 200 and the wireless power transmitter 100 can transmit application level data through a data transport stream. Application-level data transmitted through a data transport stream may consist of a data packet sequence with the following structure.

Initial ADC data packet that opens the stream.

i) Types of messages contained in the stream.

ii) Number of data bytes in the stream.

A series of ADT data packets containing the actual message.

The final ADC/end data packet that closes the stream.

Hereinafter, the data transport stream for an example in which the above ADC, ADT, and ADC/end data packets are used will be described using the drawings.

Figure 16:
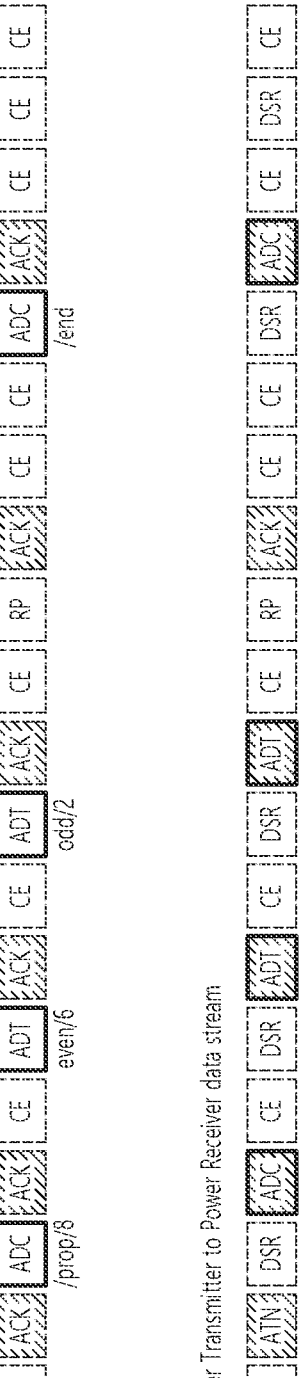
FIG. 16 illustrates an application-level data stream between the wireless power transmitter 100 and the wireless power receiver 200 according to an example.

FIG. 16 illustrates an application-level data stream between the wireless power transmitter 100 and the wireless power receiver 200 according to an example.

Referring to FIG. 16, the data stream may include auxiliary data control (ADC) data packets and/or auxiliary data transport (ADT) data packets.

ADC data packets are used to open a data stream. ADC data packets can indicate the type of message included in the stream and the number of data bytes. On the other hand, ADT data packets are sequences of data containing the actual message. ADC/end data packets are used to signal the end of a stream. For example, the maximum number of data bytes in a data transport stream may be limited to 2047.

ACK or NAC (NACK) is used to notify whether ADC data packets and ADT data packets are normally received. Between the transmission timing of the ADC data packet and the ADT data packet, control information necessary for wireless charging, such as a control error packet (CE) or DSR, may be transmitted.

Using this data stream structure, authentication-related information or other application-level information can be transmitted and received between a wireless power transmitter and a receiver.

An example for understanding the operation between the wireless power transmitter 100 and the wireless power receiver 200 in the power transfer phase 840 described above may be as follows.

Figure 17:
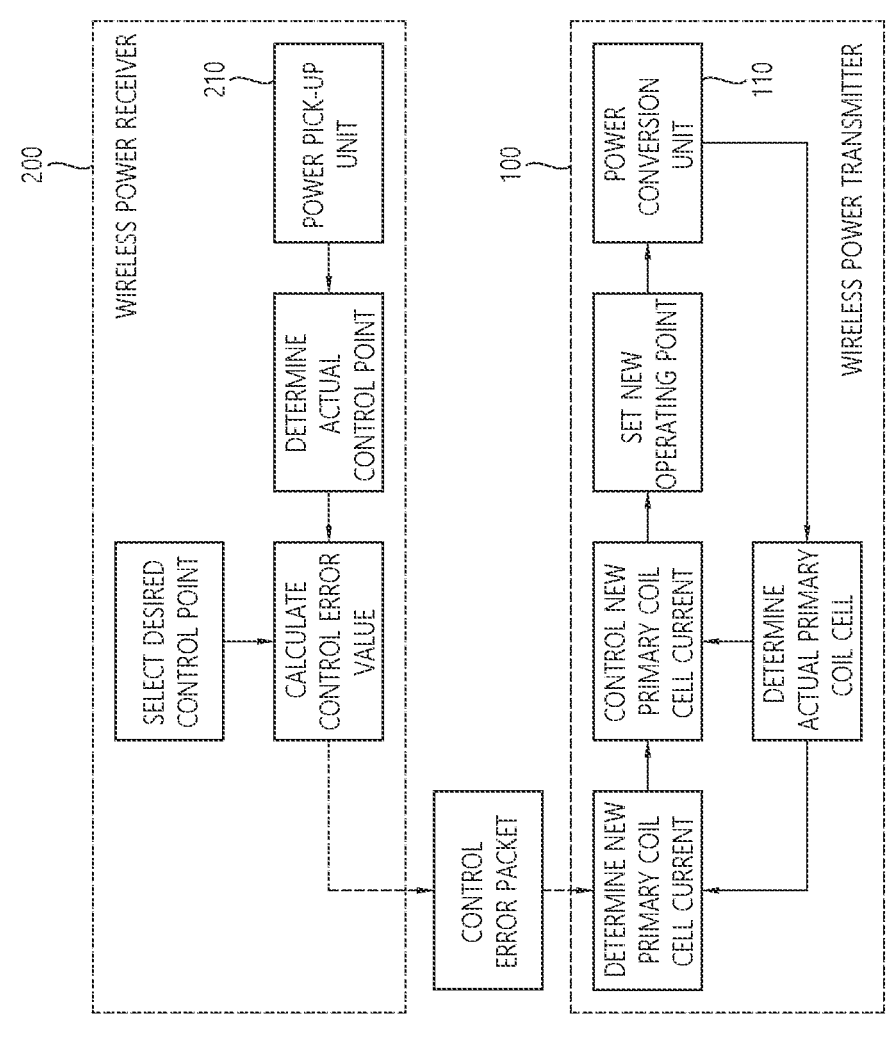
FIG. 17 shows a power control method according to one embodiment.

FIG. 17 shows a power control method according to one embodiment.

In the power transfer phase in FIG. 17, the wireless power transmitter 100 and the wireless power receiver 200 can control the amount of power transferred by performing communication along with power transmission and reception. The wireless power transmitter and wireless power receiver operate at a specific control point. The control point represents the combination of voltage and current provided from the output of the wireless power receiver when power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 17 will not be completely excluded. And, additional control of the transmitted power may be performed by using the method of FIG. 17.

Hereinafter, this specification will be described in more detail.

Wireless charging methods include a magnetic induction method using a magnetic induction phenomenon between a primary coil and a secondary coil, and a magnetic resonance method in which magnetic resonance is achieved using a frequency in a band of several tens of kHz to several MHz to transmit power. Here, the wireless charging standard for the magnetic resonance method is led by a conference called A4WP, and the magnetic induction method is led by the WPC (Wireless Power Consortium). Here, the WPC is designed to exchange various status information and commands related to the wireless charging system in-band.

Meanwhile, the specification seeks to explain in more detail the data transport stream that was outlined previously.

Data packets and response patterns used for examples of TPL from a wireless power receiver to a wireless power transmitter and/or TPL from a wireless power transmitter to a wireless power receiver may be as follows.

First, as described above, the data transport stream may include ADC and ADT.

Here, the ADC may be related to the start and end of the TPL. For example, the initial ADC may open a data stream, include the message type, and include the number of data to be sent. The final ADC closes the data stream. A more detailed description of the ADC packet is as follows.

FIG. 18 schematically shows an example of an ADC packet.

According to FIG. 18, the ADC packet may include a request field and a parameter field. And, each field at this time may be as follows.

Request field: Any one of the values below can be set.
0—ADC/end: Closes the outgoing data transport stream to the wireless power transmitter.
2—ADC/auth: Opens the authentication data transport stream to the wireless power transmitter.
5—ADC/rst: Resets all incoming and outgoing data transport streams.
0x10 . . . 0x1F—ADC/prop: Opens a proprietary data transport stream to the wireless power transmitter.
And the parameters may be as follows.
Parameter: For proprietary (ADC/prop) and authenticated (ADC/auth) data transport streams, the number of data bytes in the stream. Set this field to 0 in ADC/end and ADC/rst data packets.

Meanwhile, ADT may be related to the actual transmitted data packet. ADT is a data packet that is actually transmitted, and the number and even/odd number of data transmitted can be expressed by the header. And, currently, ADT is capable of transmitting data from a minimum of 1 byte to a maximum of 7 bytes.

A more detailed description of the ADT packet is as follows.

FIG. 19 schematically shows an example of an ADT packet.

According to FIG. 19, the ADT packet may include a data field. And, the data field at this time may be defined by the application layer.

Here, the ADT data packet may carry an application layer message transmitted between the wireless power transmitter and the wireless power receiver in the data transport stream. Currently, ADT data packet sizes range from 1 to 7, for example, and each size can be used with odd and even headers.

And as previously explained, the odd/even header may correspond to a header used to inform whether data transmission is being retransmitted.

Meanwhile, as described above, data in the application layer may include authentication data. And, as explained earlier, because data in the application layer is exchanged between the wireless power transmitter and wireless power receiver through a data transport stream, authentication data may also be exchanged between the wireless power transmitter and wireless power receiver via the data transport stream.

Hereinafter, an example in which authentication data is exchanged between a wireless power transmitter and a wireless power receiver through a data transport stream will be described.

Figure 20:
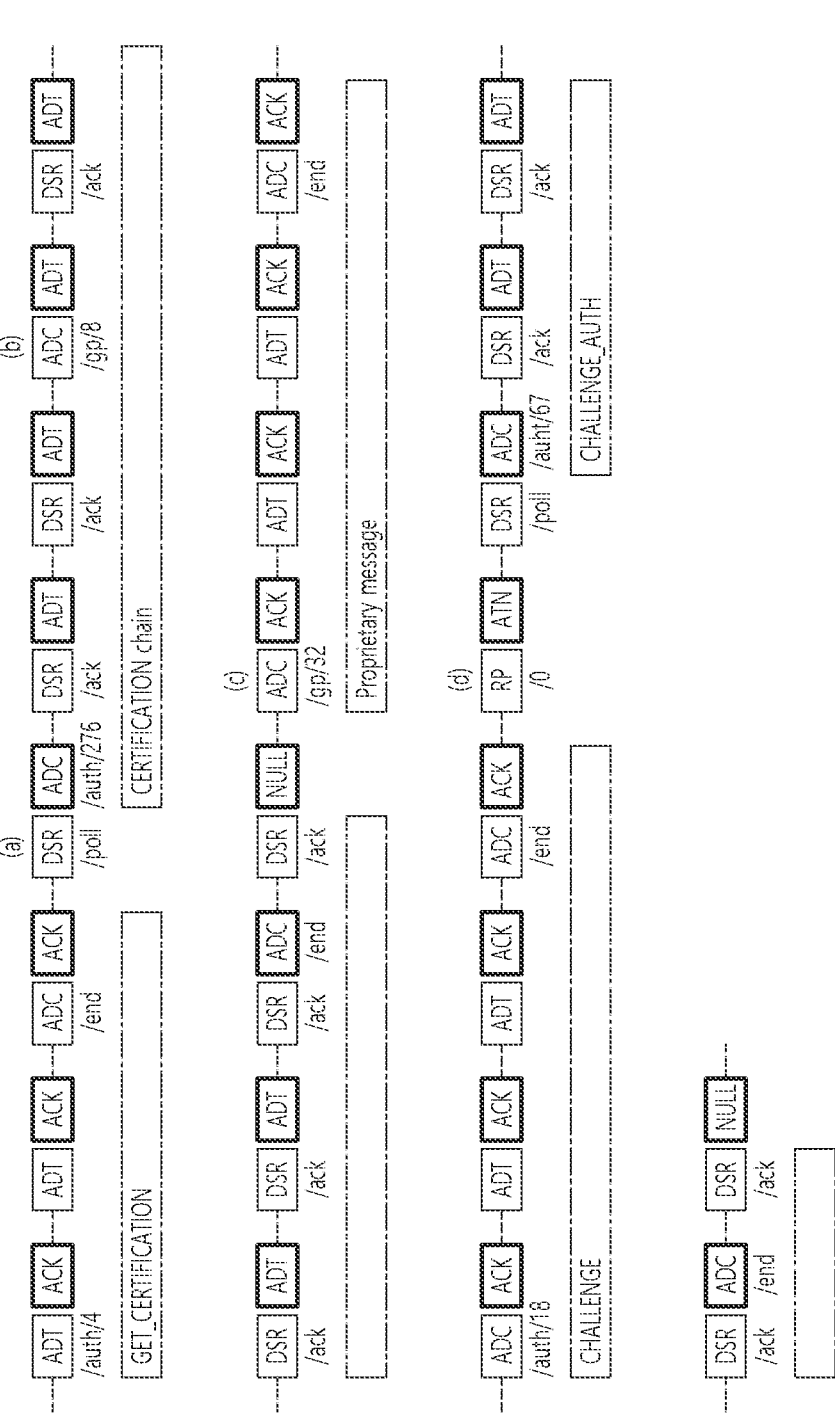
FIGS. 20 and 21 schematically show an example in which authentication data is exchanged between a wireless power transmitter and a wireless power receiver through a data transport stream.
Figure 21:
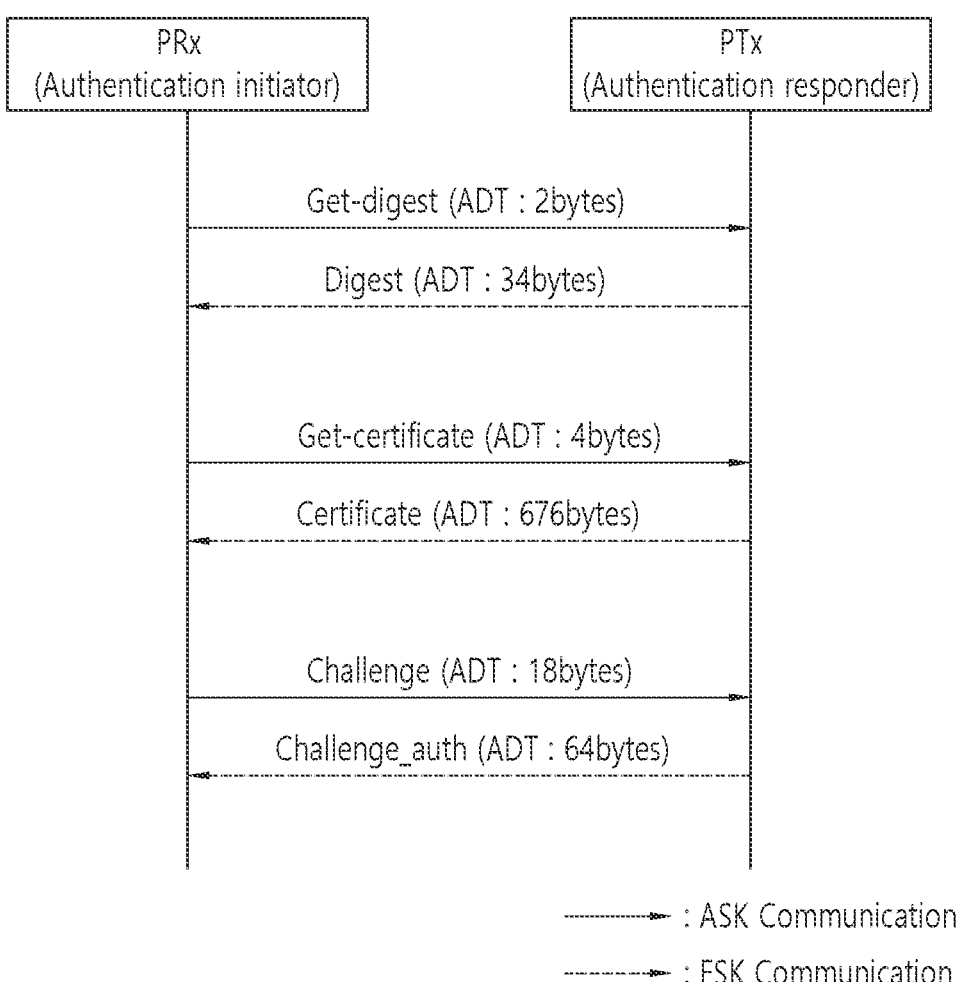

FIGS. 20 and 21 schematically show an example in which authentication data is exchanged between a wireless power transmitter and a wireless power receiver through a data transport stream.

As shown in FIG. 20, the wireless power receiver can transmit an authentication message by transmitting a data transport stream to the wireless power transmitter. Protocols related to this are shown in (a) to (c) in FIG. 20. As shown in (a) to (c) of FIG. 20, the wireless power receiver can transmit ADC and ADT to the wireless power transmitter, the wireless power receiver can transmit an authentication message to the wireless power transmitter through ADC and ADT.

Meanwhile, the wireless power receiver may receive a data transport stream from the wireless power transmitter and receive an authentication message. The protocol related to this is shown in (d) in FIG. 20. As shown in (d) of FIG. 20, the wireless power receiver can receive ADC and ADT from the wireless power transmitter, the wireless power receiver can receive an authentication message from the wireless power transmitter through ADC and ADT.

FIG. 21 shows an example in which a wireless power receiver and a wireless power transmitter exchange authentication messages. In this example, it is assumed that the wireless power receiver is the authentication initiator and the wireless power transmitter is the authentication responder.

As shown in FIG. 21, the wireless power receiver transmits 'GET-DIGEST' to the wireless power transmitter through ADT, the wireless power receiver can receive 'DIGEST' from the wireless power transmitter through ADT.

Additionally, the wireless power receiver may transmit 'GET-CERTIFICATE' to the wireless power transmitter through ADT, and the wireless power receiver may receive 'CERTIFICATE' from the wireless power transmitter through ADT.

Additionally, the wireless power receiver may transmit 'CHALLENGE' to the wireless power transmitter through ADT, and the wireless power receiver may receive 'CHALLENGE_AUTH' from the wireless power transmitter through ADT.

Here, specific examples of authentication messages (e.g. 'GET-DIGEST' 'DIGEST', 'GET-CERTIFICATE', 'CERTIFICATE', 'CHALLENGE', 'CHALLENGE_AUTH') exchanged between the wireless power transmitter and the wireless power receiver are the same as described above.

As above, when exchanging ADT packets between a wireless power transmitter and a wireless power receiver, communication from the wireless power receiver to the wireless power transmitter may correspond to ASK communication. In the ASK communication at this time, considering only the ADT packet, for example, 24 bytes can be transmitted. Communication from the wireless power transmitter to the wireless power receiver may correspond to FSK communication. In FSK communication at this time, considering only ADT packets, for example, 774 bytes can be transmitted.

In other words, the amount of data (774 bytes) transmitted through FSK communication is larger than the amount of data (24 bytes) transmitted through ASK communication.

Based on the above amount of data being transmitted, the time required for authentication through the data transport stream may be as follows.

FIGS. 22 and 23 schematically show examples of the time required for authentication through a data transport stream.

As previously explained, the size of the ADT, that is, the size of the ADT packet delivered at one time when ADT data information is transmitted, may correspond to 7 bytes or less by current standards.

Here, in FIG. 22, an example of authentication time is shown based on the size of the ADT, for example, 7 bytes or 4 bytes.

For example, when the ADT size is 7 bytes, that is, when ADT packets are transmitted in units of 7 bytes, the total time taken for authentication may, for example, correspond to 82122 ms including waiting time. Or, for example, when the ADT size is 4 bytes, that is, when ADT packets are delivered in units of 4 bytes, the total time taken for authentication may, for example, correspond to 110486 ms including waiting time.

As previously explained, ASK communication is performed in communication from a wireless power receiver to a wireless power transmitter. And, FSK communication is performed for communication from the wireless power transmitter to the wireless power receiver. At this time, if the example of FIG. 22 is divided into ASK communication time and FSK communication time and compared, it can be organized as shown in FIG. 23.

As shown in FIG. 23, when the ADT size is 7 bytes, the ASK communication time may correspond to 3103 ms. And the FSK communication time can correspond to 73712 ms. Meanwhile, when the ADT size is 4 bytes, the ASK communication time may correspond to 3102 ms. And, the FSK communication time may correspond to 102490 ms.

As can be seen above, in communication between a wireless power transmitter and a wireless power receiver, the part where communication time takes a long time corresponds to when FSK communication is performed.

Accordingly, in this specification, in order to provide high-speed FSK, a configuration may be provided that changes the speed of FSK by changing the number of cycles representing 0/1 logic of FSK communication Through the information exchanged between the wireless power transmitter and wireless power receiver in the negotiation phase, this can be achieved by changing the number of cycles (NCYCLES) (for example, this may mean changing the value of the divider).

Here, for example, the correlation between the number of dividers, the corresponding number of cycles, and the change in transmission speed due to changing the number of cycles is explained in the table below.

TABLE 2

| Divider | ZERO (Cycle(s)) | ONE (Cycle(s)) | Baud rate (@128 kHz) |
|---|---|---|---|
| 1 | 512 | 256 | 250 bps |
| 2 | 256 | 128 | 500 bps |
| 4 | 128 | 64 | 1000 bps |
| 8 | 64 | 32 | 2000 bps |
| 16 | 32 | 16 | 4000 bps |
| 32 | 16 | 8 | 8000 bps |
| 64 | 18 | 4 | 16000 bps |

In addition, information about the change in the number of cycles (NCYCLES) may be transmitted through a specific request (SRQ) transmitted from the wireless power receiver to the wireless power transmitter in the negotiation phase or renegotiation phase. SRQ packets can be structured as shown in the table below.

TABLE 3

| | b7 | b6 | b5 | b4 | b3 | b2 | b1 | b0 |
|---|---|---|---|---|---|---|---|---|
| B0 | | | | Request | | | | |
| B1 | | | | Request parameter | | | | |

Here, the request field may have values as shown in the following table.

TABLE 4

| request | description | request parameter |
|---|---|---|
| 0x00 | End Negotiation | Change Count |
| 0x01 | Guaranteed Power | Guaranteed Power Value |
| 0x02 | Received Power Packet Type | Received Power Packet Header |
| 0x03 | FSK Parameters | Polarity And Depth |
| 0x04 | Maximum Power | Maximum Power Value |
| 0x05 to 0xEF | Reserved | N.A. |
| 0xF0 to 0xFF | Proprietary | Proprietary |

Here, changing the number of cycles (NCYCLES) can be achieved, for example, through a request with a value of 0x03 (FSK parameter). And at this time, the format of the request parameter field may be as shown in the table below.

TABLE 5

| | b7 | b6 | b5 | b4 | b3 | | b2 | b1 | b0 |
|---|---|---|---|---|---|---|---|---|---|
| B1 | | Reserved | | | NCYCLES | | Polarity | | Depth |

Here, the NCYCLES (number of cycles (s)) field may be a field indicating the number of cycles per (FSK) symbol. Here, the NCYCLES field may include, for example, 00b, 01b, 10b, 11b, etc. For example, if 00b is ZERO, it may mean that the number of cycles is 512, which may correspond to the default value. Additionally, 01b can mean 256, 10b can mean 128, and 11b can mean 64. Meanwhile, when changing the number of cycles (NCYCLES), an SRQ with a separate request value can be used, rather than the SRQ with a request value of 0x03 described above, the SRQ at this time may, for example, be named an SRQ FFSK (fast FSK) packet.

In summary, in the negotiation phase, the wireless power receiver may transmit an SRQ related to FSK settings to the wireless power transmitter, and the SRQ at this time may correspond to, for example, SRQ/fsk.

That is, the wireless power receiver can set NCYCLES (information related to the number of cycles used to express 0 and 1 in FSK) to be reduced using the reserved bits in SRQ. (e.g., "00"=512(0)/256(1), "01"=25(40)/128(1), "10"=128(0)/64(1), "11"=64(0)/32(1))

When the wireless power transmitter transmits an ACK response to the above SRQ, FSK communication can proceed based on the reduced NCYCLES after negotiation is completed.

And, for example, by reducing the NCYCLES of FSK to 64/32, a communication speed similar to that of ASK can be achieved, so the difference in communication speed between ASK and FSK in the data transport stream described above can be improved.

The problems resulting from the points explained above can be summarized as follows.

As explained, the fact that the ADT size is fixed to 7 bytes causes TPL authentication to take a lot of time. It is based on that the amount of data exchanged through FSK communication from the wireless power transmitter to the wireless power receiver is greater than the amount of data exchanged through ASK communication from the wireless power receiver to the wireless power transmitter and that there is also a difference in communication speed (ASK: 2 Kbps, FSK: 250 bps). In other words, FSK communication speed has a significant impact on authentication time.

In the above situation, as previously explained, fast FSK provides a way to improve communication speed by reducing NCYCLES (512/256 cycles (s)) of the current FSK.

Here, the FSK communication speed can be improved because NCYCLES is reduced with Fast FSK, but the actual band of the data communication stream through TPL does not increase. In other words, as NCYCLES is reduced, there are sections where communication does not occur, so the problem arises that the actual TPL speed remains the same. This problem can be explained through drawings as follows.

Figure 24:
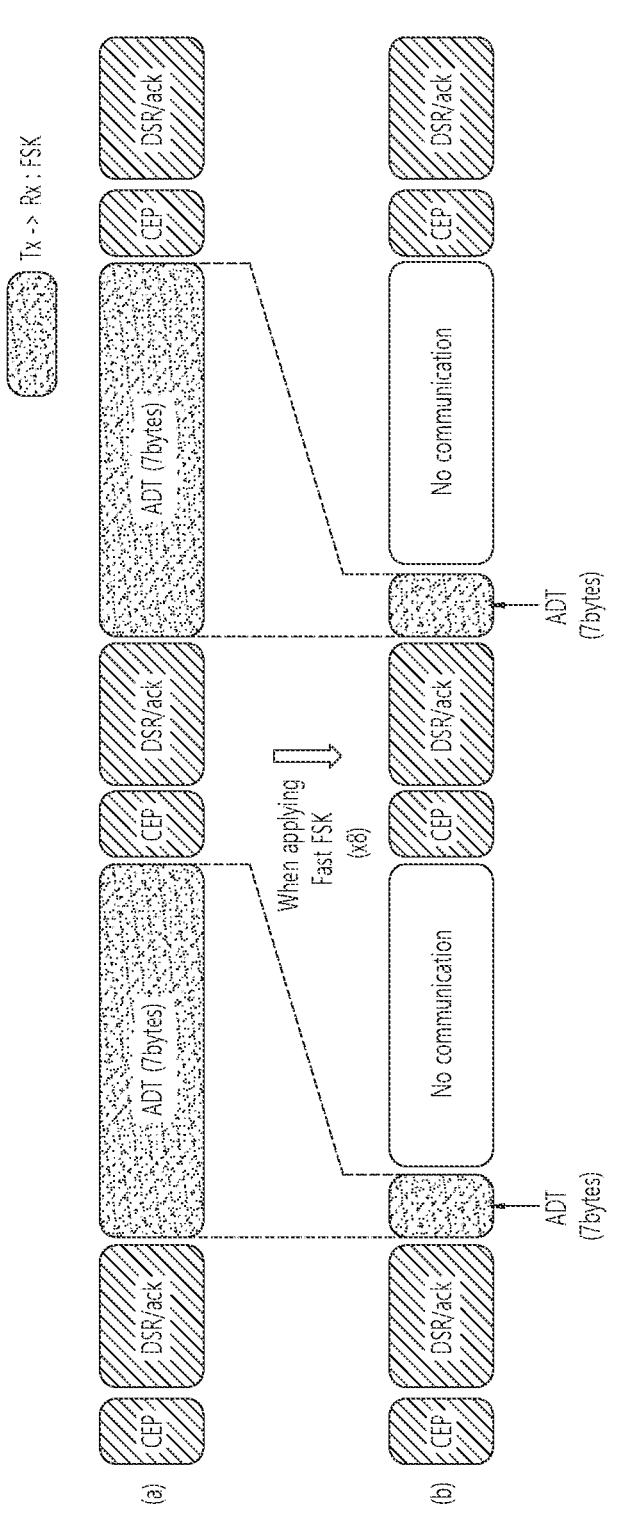
FIG. 24 schematically shows an example of a problem in which the TPL speed is maintained even during fast FSK.

FIG. 24 schematically shows an example of a problem in which the TPL speed is maintained even during fast FSK.

As shown in (a) of FIG. 24, ADT packets can be exchanged with a size of 7 bytes.

For example, the wireless power transmitter may transmit an ADT packet with a size of 7 bytes to the wireless power receiver. Additionally, the wireless power receiver may transmit DSR/ack to the wireless power transmitter as ACK for reception of the above ADT packet.

Afterwards, the wireless power transmitter transmits the next ADT packet with a size of 7 bytes to the wireless power receiver, and the wireless power transmitter can receive DSR/ack from the wireless power receiver in response.

Meanwhile, as shown in (b) of FIG. 24, ADT packets can be exchanged based on fast FSK as previously described. That is, based on fast FSK, ADT packets can be transmitted within a shorter time.

However, even though ADT packets are transmitted within a short time based on fast FSK, according to the current transmission protocol, since the CE packet (CEP) or DSR/ack packet is not transmitted/received immediately after the ADT packet, inevitably, a section without communication, that is, a 'no communication' section, occurs after the ADT packet based on fast FSK.

And, due to this communication-free section, even if fast FSK is supported, a problem arises in that the time of the entire data transport stream is not significantly reduced compared to the existing method. In other words, 'No communication' occurs as the FSK speed increases, as such, since TPL is not entirely dependent on FSK speed, despite fast FSK, there is a problem that the actual data band rate does not increase.

Accordingly, this specification seeks to provide a method for improving the TPL data band in the case of fast FSK based on NCYCLE. That is, this specification seeks to provide a method for increasing the actual data band rate.

First, to explain the proposal of the specification, the specification describes ADT packets based on incremented bytes.

The fact that the number of FSK cycles can be reduced may mean that a greater amount of data can be transmitted per unit time when exchanging data between a wireless power transmitter and a wireless power receiver. That is, because the number of FSK cycles can be reduced, the size of the ADT packet exchanged between the wireless power transmitter and the wireless power receiver can be larger than before.

FIG. 25 schematically shows an example of increased ADT packet size.

According to FIG. 25, for example, the size of the above ADT packet can be increased from the existing 7 bytes to 27 bytes, and an example of this can be seen in the drawing.

And, even when the size of the ADT packet becomes large, such as 27 bytes, whether or not to retransmit the ADT data packet can be indicated based on the even/odd header as described above.

In summary, based on the reduced NCYCLES, the ADT size can be increased to increase the efficiency of TPL communication, previously, the maximum ADT size was 7 bytes, but according to this specification, the maximum ADT size can be increased to 27 bytes.

Hereinafter, the present specification seeks to provide a configuration in which a wireless power receiver indicates to a wireless power transmitter a unit size for at least one piece of ADT information transmitted by the wireless power transmitter. In addition, the present specification also seeks to provide a configuration in which a wireless power transmitter transmits at least one ADT information to a wireless power receiver based on the above unit size.

Additionally, in this specification, based on the wireless power transmitter transmitting ADT information to the wireless power receiver in shorter time intervals, by having the wireless power receiver transmit CE packets (CEPs) to the wireless power transmitter more frequently than before, the specification also seeks to provide a configuration that performs power control more quickly.

The following drawings were prepared to explain a specific example of the present specification. Since the names of specific devices or specific signals/messages/fields described in the drawings are provided as examples, the technical features of this specification are not limited to the specific names used in the drawings below.

Figure 26:
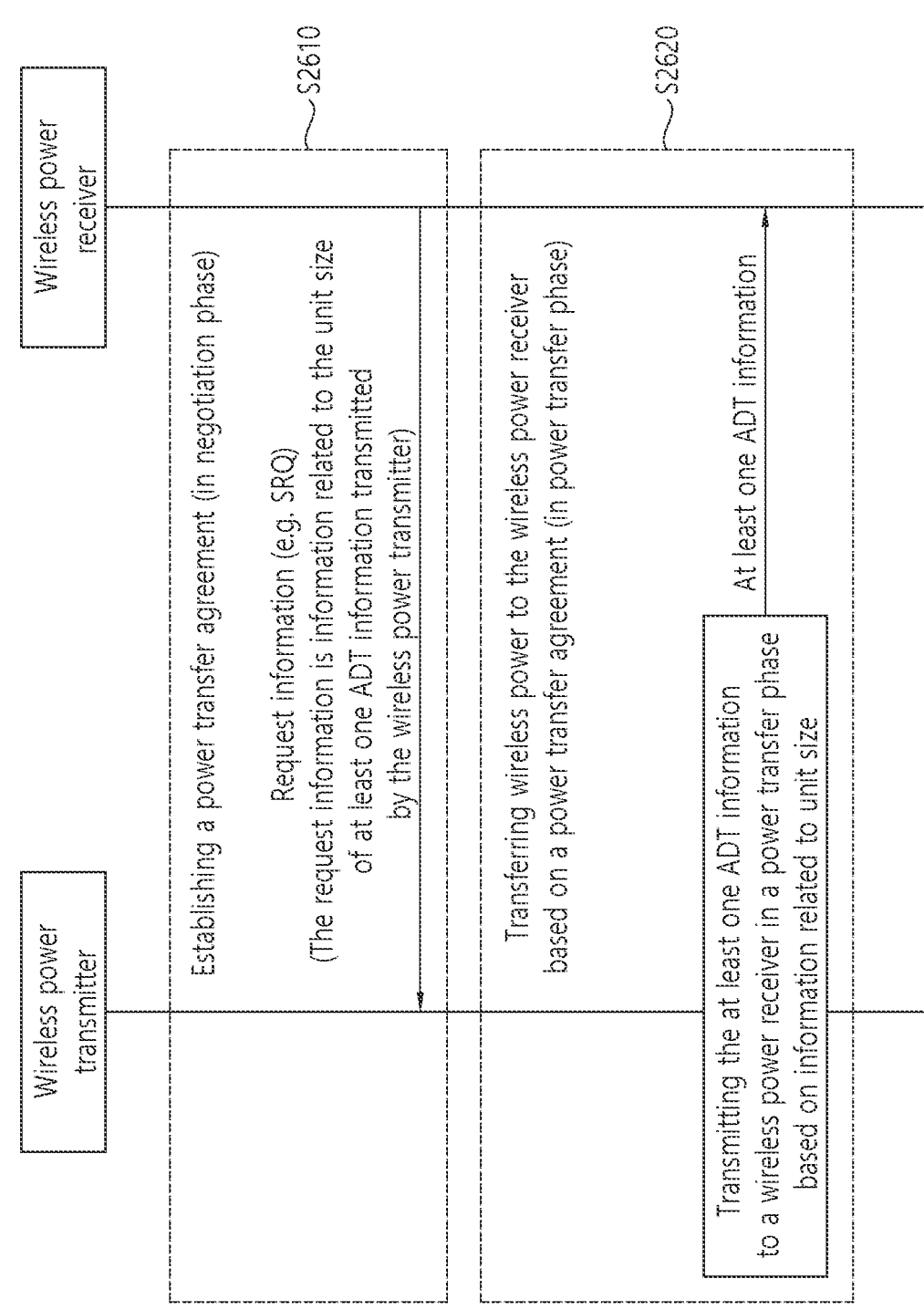
FIG. 26 is a flowchart of a method for transmitting wireless power, according to an embodiment of the present specification.

FIG. 26 is a flowchart of a method for transmitting wireless power, according to an embodiment of the present specification.

According to FIG. 26, the wireless power transmitter can establish a power transfer contract with the wireless power receiver (S2610). Here, the wireless power transmitter establishing a power transfer contract with the wireless power receiver may be accomplished, for example, in a negotiation phase. Alternatively, the wireless power transmitter establishing a power transfer contract with the wireless power receiver may also be accomplished in the renegotiation phase (in the power transfer phase).

The power transfer contract here may be, for example, an expanded power transfer contract. Additionally, the extended power transfer contract may refer to a power transfer contract that supports EPP as explained previously.

The wireless power transmitter may receive request information from the wireless power receiver in a negotiation (or renegotiation) phase. Here, the request information may be information related to the unit size of at least one ADT (auxiliary data transport) information transmitted by the wireless power transmitter. That is, the request information may indicate the unit size of ADT through which at least one ADT information can be transmitted.

Here, the request information at this time may mean, for example, SRQ. As described above, the basic structure of an SRQ may include a request field and a parameter field. In addition, more specific examples of SRQ provided in this specification will be described later.

Thereafter, the wireless power transmitter may transfer wireless power to the wireless power receiver based on the power transfer contract established in the power transfer phase (S2620). At this time, the wireless power transmitter may transmit at least one ADT information to the wireless power receiver in the power transfer phase based on information related to the unit size.

Hereinafter, the type of request information will be distinguished and the example in FIG. 26 will be described in more detail.

1. Request for Fixed ADT Size

The wireless power transmitter may receive request information from the wireless power receiver. And at this time, the request information may request a fixed ADT size (used when ADT information is transmitted). That is, the wireless power receiver can indicate a fixed unit ADT size to be used when the wireless power transmitter transmits ADT information through the request information.

The procedure for this is explained through drawings as follows.

Request Procedure for Fixed ADT Size

Figure 27:
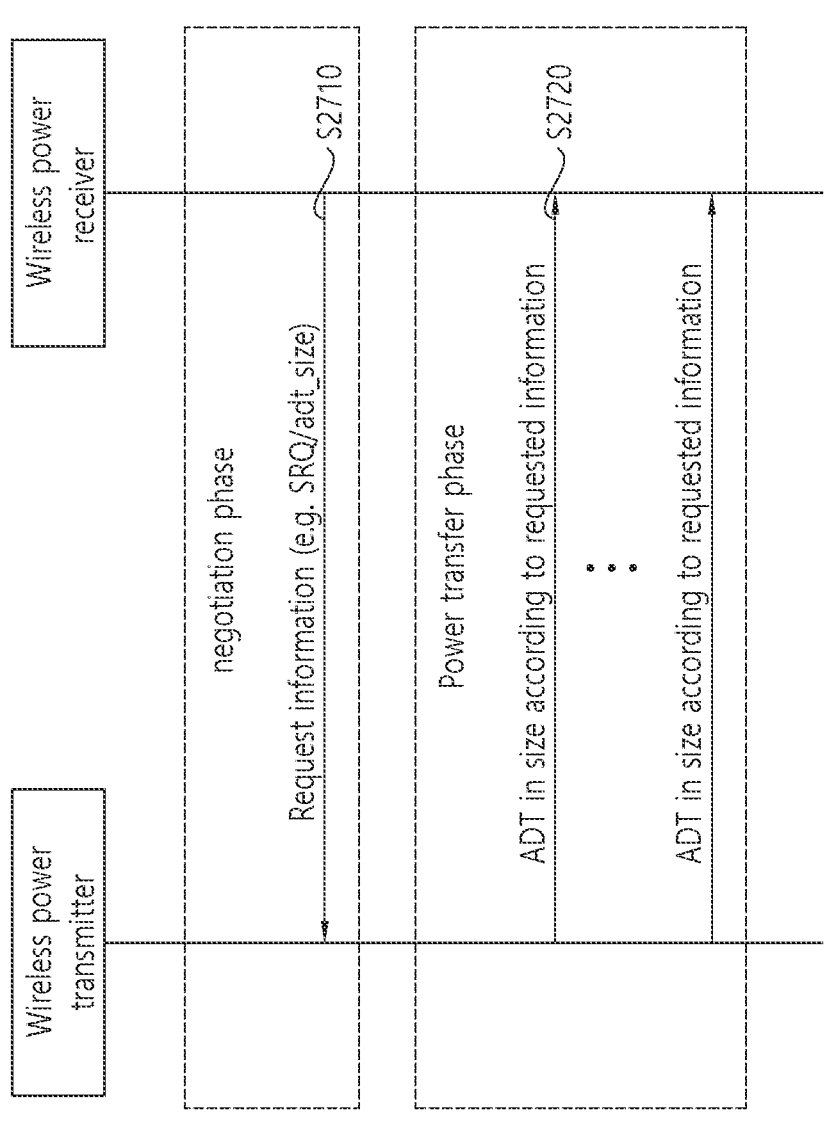
FIG. 27 is a flowchart of a method for requesting a fixed ADT size, according to an embodiment of the present specification.

FIG. 27 is a flowchart of a method for requesting a fixed ADT size, according to an embodiment of the present specification.

According to FIG. 27, the wireless power transmitter can receive request information from the wireless power receiver (S2710). Here, the request information may be transmitted from the wireless power receiver to the wireless power transmitter in the negotiation phase (or renegotiation phase).

Here, by fixing the ADT size transmitted during TPL to a specific payload, the wireless power transmitter may negotiate with the wireless power receiver regarding request information (eg, SRQ/adt_size) corresponding to the size transmitted to the wireless power receiver.

The ADT size of a specific payload transmitted by the wireless power transmitter may be set by the wireless power receiver in consideration of power control loops such as CEP interval and/or RP interval.

That is, the wireless power receiver determines the ADT size based on the CEP interval and/or RP interval based on the extent to which power control is to be performed, and transmits information about the ADT size to the wireless power transmitter through request information.

Thereafter, the wireless power transmitter may transmit at least one ADT of a size according to the request information to the wireless power receiver (S2720).

The request information used at this time can be explained through drawings as follows.

Structure of Request Information Packet

FIG. 28 shows an example of information requesting a fixed ADT size.

According to FIG. 28, the request information may be, for example, 'SRQ/adt_size'. In addition, the request information at this time may also include a request field and a parameter field as described previously.

At this time, the parameter in 'SRQ/adt_size' may indicate the ADT size that the wireless power transmitter should send. For example, if the parameter value is 0x07, the wireless power transmitter can transmit ADT information to the wireless power receiver with an ADT size of 7 bytes.

And, as previously explained, according to this specification, the ADT size may have a size of, for example, 27 bytes, in this case (for example, when the parameter indicates 27 bytes), the wireless power transmitter can transmit ADT information to the wireless power receiver with an ADT size in units of 27 bytes.

Here, the parameter field at this time may be set by the CE packet interval and/or time requirements and/or other conditions of the wireless power receiver within the maximum value of the supported ADT size. That is, the wireless power receiver can set the above parameter field value according to the above conditions and negotiate the ADT size with the wireless power transmitter based on the value of the above field.

Negotiation of Fixed ADT Size Based on Request Information

In relation to negotiation, for example, the wireless power receiver may transmit request information such as 'SRQ/adt_size' to the wireless power transmitter in the negotiation phase (or renegotiation phase).

If the wireless power transmitter supports transmitting ADT information in size units indicated by 'SRQ/adt_size', the wireless power transmitter can transmit an ACK for the above request information to the wireless power receiver. And, in the power transfer phase, the wireless power transmitter may transmit ADT information to the wireless power receiver in size units negotiated based on the above request information.

On the other hand, if the wireless power transmitter does not support transmitting ADT information in size units indicated by 'SRQ/adt_size', the wireless power transmitter may transmit a NAK for the above request information to the wireless power receiver. If the wireless power receiver receives the NAK, the wireless power transmitter may transmit new request information, that is. 'SRQ/adt_size', to the wireless power receiver. At this time, the value of the parameter included in 'SRQ/adt_size' may correspond to a smaller value than the parameter value in 'SRQ/adt_size' previously transmitted. If the wireless power transmitter supports the ADT size indicated by the newly received 'SRQ/adt_size', the wireless power transmitter can transmit an ACK for the above new request information to the wireless power receiver. And, in the power transfer phase, the wireless power transmitter can transmit ADT information to the wireless power receiver in the negotiated size unit based on the negotiated request information (i.e., the request information for which the wireless power transmitter sends an ACK).

Example of Transmission of Authentication Information Based on Fixed ADT Size

FIG. 29 schematically shows an example in which ADT information is transmitted from a wireless power transmitter to a wireless power receiver based on the negotiated fixed ADT size.

According to FIG. 29, authentication data corresponding to application layer data called 'Challenge_auth' may be transmitted from the wireless power transmitter to the wireless power receiver. And, the authentication data at this time can be transmitted from the wireless power transmitter to the wireless power receiver through an ADT packet in the data transport stream.

Here, as can be seen in FIG. 29, the wireless power transmitter transmits ADC to the wireless power receiver, DSR/ack for ADC (the ADC at this time may correspond to the initials ADC, meaning the start of a data transport stream) can be received from the wireless power receiver. Afterwards, the wireless power transmitter may transmit an ADT packet for transmitting 'Challenge_auth' to the wireless power receiver in units of 21 bytes.

Example of Use of ADT Transmission Based on Fixed ADT Size

Meanwhile, as described above, even if the wireless power transmitter supports transmitting a larger amount of ADT data to the wireless power receiver per unit time through fast FSK, it is not desirable that a large ADT is always negotiated between a wireless power transmitter and a wireless power receiver. That is, in some cases, it may be desirable to perform power control more frequently between the wireless power receiver and the wireless power transmitter. In this case, instead of exchanging a large amount of ADT data at once, it may be desirable for CE packets to be exchanged more frequently.

On the other hand, when power control does not need to be performed frequently, it may be desirable to exchange a large amount of ADT data at once between the wireless power transmitter and wireless power receiver in units of large ADT sizes.

Therefore, in the following, when the ADT size is determined between the wireless power transmitter and the wireless power receiver, at this time, a configuration is provided in which the ADT size is determined based on whether any communication will occur between the wireless power transmitter and the wireless power receiver.

Figure 30:
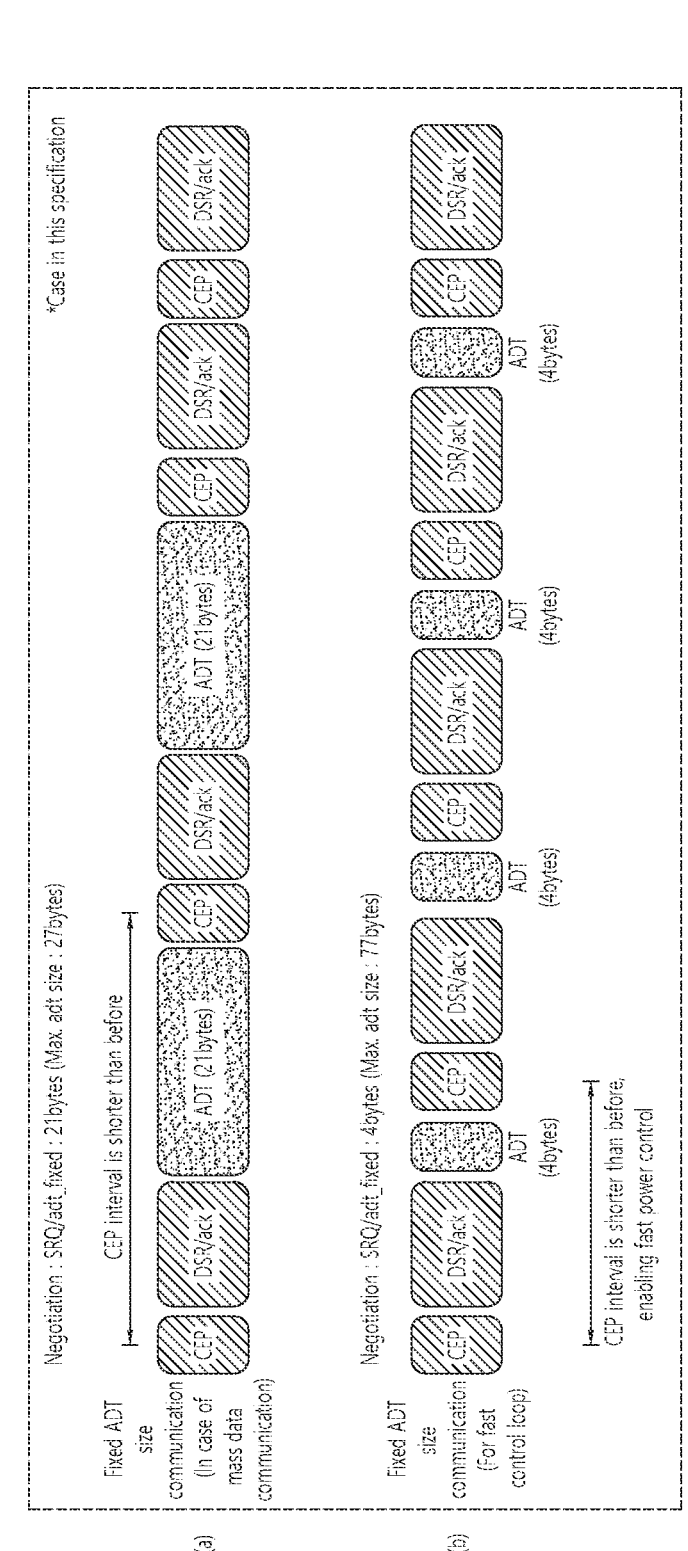
FIG. 30 schematically shows two examples of TPL communication through a fixed ADT size.

FIG. 30 schematically shows two examples of TPL communication through a fixed ADT size.

In FIG. 30 (*a*), an example of large-scale data communication is shown. As shown in (a) of FIG. 30, if the wireless power receiver does not want a fast power control loop, there may be no need to transmit CE packets to the wireless power transmitter more frequently than before. In this case, the wireless power transmitter can transmit a larger amount of data between CE packets to the wireless power receiver.

Accordingly, the wireless power receiver can increase the amount of data communication instead of more frequent power control by setting the parameter in the request information (e.g. SRQ/adt_size) to the theoretically possible maximum ADT size (e.g., 27 bytes). When the communication speed is increased in this way, the communication speed between the wireless power transmitter and the wireless power receiver can be increased.

In (b) of FIG. 30, an example of a case in which a fast control loop is performed is shown. As shown in (b) of FIG. 30, when the wireless power receiver desires a fast power control loop, the wireless power receiver may transmit a CE packet to the wireless power transmitter.

Accordingly, the wireless power receiver can set the parameter in 'SRQ/adt_size' to a relatively small size. That is, after the wireless power receiver sets the parameter value in the request information (e.g. 'SRQ/adt_size') to, for example, 4 bytes, the request information can be transmitted to the wireless power transmitter. If TPL is performed in this way, power control can be performed faster than before.

2. Request for Maximum ADT Size

Unlike the request for a fixed ADT size described earlier, the wireless power receiver can transmit request information about the maximum ADT size to the wireless power transmitter. And at this time, the request information may request the maximum ADT size (used when ADT information is transmitted). That is, the wireless power receiver can indicate the maximum ADT size that the wireless power transmitter can use when transmitting ADT information through the request information.

Here, the maximum ADT size may mean the maximum size of ADT information that the wireless power transmitter can transmit at once. In other words, when the wireless power transmitter receives the above maximum ADT size through request information from the wireless power receiver, the wireless power transmitter may transmit ADT information to the wireless power receiver based on a size that is equal to or smaller than the indicated maximum ADT size.

The procedure for this is explained through drawings as follows.

Request Procedure for Maximum ADT Size

Figure 31:
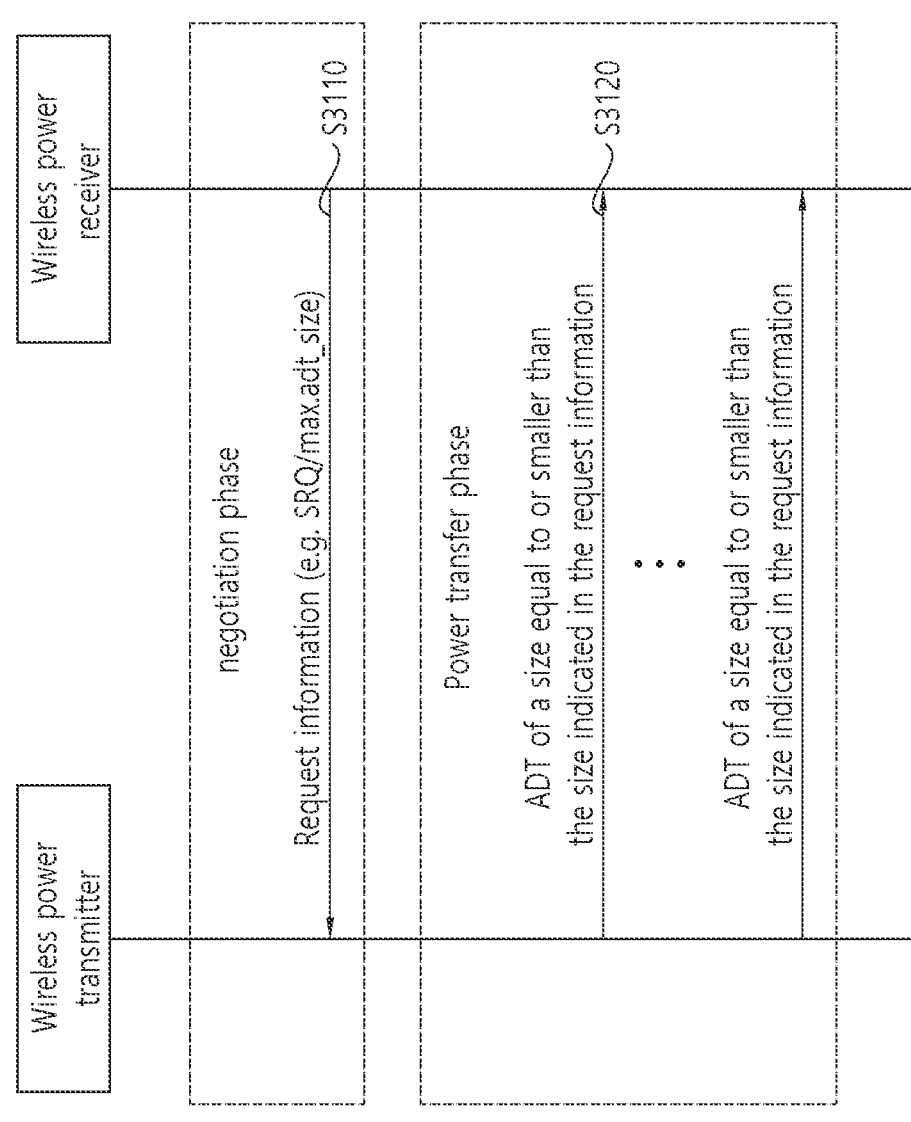
FIG. 31 is a flowchart of a method for requesting the maximum ADT size, according to an embodiment of the present specification.

FIG. 31 is a flowchart of a method for requesting the maximum ADT size, according to an embodiment of the present specification.

According to FIG. 31, the wireless power transmitter can receive request information from the wireless power receiver (S3110). Here, the request information may be transmitted from the wireless power receiver to the wireless power transmitter in the negotiation phase (or renegotiation phase).

The ADT size of a specific payload transmitted by the wireless power transmitter may be set by the wireless power receiver in consideration of power control loops such as CEP interval and/or RP interval.

That is, the wireless power receiver determines the maximum ADT size based on the CEP interval and/or RP interval based on the extent to which power control is to be performed, information about the above maximum ADT size can be transmitted to the wireless power transmitter through request information.

Thereafter, the wireless power transmitter may transmit at least one ADT to the wireless power receiver in units of a size equal to or smaller than the size indicated in the request information (S3120).

The request information used at this time can be explained through drawings as follows.

Structure of Request Information Packet

FIG. 32 shows an example of information requesting the maximum ADT size.

According to FIG. 32, the request information may be, for example, 'SRQ/max.adt_size'. In addition, the request information at this time may also include a request field and a parameter field as described previously.

At this time, the parameter in 'SRQ/max.adt_size' may indicate the maximum ADT size that the wireless power transmitter should send. For example, if the parameter value is 0x07, the wireless power transmitter can transmit ADT information to the wireless power receiver with an ADT size within 7 bytes (or less). That is, if the maximum ADT size is indicated as 7, it may be impossible for the wireless power transmitter to transmit ADT to the wireless power receiver in units of 8 bytes in size.

And, as previously explained, according to this specification, the ADT size may have a size of, for example, 27 bytes, for example, when the parameter indicates 27 bytes, the wireless power transmitter can transmit ADT information to the wireless power receiver with an ADT size within (or less than) 27 bytes.

Here, the parameter field at this time may be set by the CE packet interval and/or time requirements and/or other conditions of the wireless power receiver within the maximum value of the supported ADT size. That is, the wireless power receiver can set the above parameter field value according to the above conditions and negotiate the ADT size with the wireless power transmitter based on the value of the above field.

Here, if the wireless power receiver and/or wireless power transmitter prioritizes the fast control loop, the parameter value in 'SRQ/max.adt_size' may be determined within a small size value. If the wireless power receiver and/or wireless power transmitter prioritizes data transmission, the parameter value in 'SRQ/max.adt_size' may be determined as the maximum size value among the list of supported ADT sizes.

Negotiation of Maximum ADT Size Based on Request Information

Regarding negotiation, for example, the wireless power receiver may transmit request information such as 'SRQ/max.adt_size' to the wireless power transmitter in the negotiation phase (or renegotiation phase).

If the wireless power transmitter supports transmitting ADT information in size units within the size indicated by 'SRQ/max.adt_size', the wireless power transmitter can transmit an ACK for the above request information to the wireless power receiver. And, in the power transfer phase, the wireless power transmitter may transmit ADT information to the wireless power receiver in size units within the size negotiated based on the above request information.

On the other hand, if the wireless power transmitter does not support transmitting ADT information in size units within the size indicated by 'SRQ/max.adt_size', the wireless power transmitter may transmit a NAK for the above request information to the wireless power receiver. If the wireless power receiver receives the NAK, the wireless power transmitter may transmit new request information, that is, 'SRQ/max.adt_size', to the wireless power receiver. At this time, the value of the parameter included in 'SRQ/max.adt_size' may correspond to a smaller value than the value of the parameter in 'SRQ/max.adt_size' previously transmitted. If the wireless power transmitter supports the maximum ADT size indicated in the newly received 'SRQ/max.adt_size', the wireless power transmitter may transmit an ACK for the above new request information to the wireless power receiver. And, in the power transfer phase, the wireless power transmitter may transmit ADT information to the wireless power receiver in size units within the negotiated maximum size based on the negotiated request information (i.e., request information to which the wireless power transmitter transmits ACK).

Example of Transmission of Authentication Information Based on Maximum ADT Size

FIG. 33 schematically shows an example in which ADT information is transmitted from a wireless power transmitter to a wireless power receiver based on the negotiated maximum ADT size.

According to FIG. 33, authentication data corresponding to application layer data called 'Challenge_auth' may be transmitted from the wireless power transmitter to the wireless power receiver. And, the authentication data at this time can be transmitted from the wireless power transmitter to the wireless power receiver through an ADT packet in the data transport stream.

Here, as can be seen in FIG. 33, the wireless power transmitter transmits ADC to the wireless power receiver. DSR/ack for ADC (the ADC at this time may correspond to the initials ADC, meaning the start of a data transmission stream) can be received from the wireless power receiver. Thereafter, the wireless power transmitter may transmit an ADT packet for transmitting 'Challenge_auth' to the wireless power receiver in byte units (e.g., 7 bytes) that are equal to or smaller than the indicated maximum ADT size.

Here, as shown in FIG. 33, when the maximum CEP interval during TPL is fixed at 700 ms and the maximum ADT size increases, in the negotiation phase, the wireless power receiver transmits 'SRQ/max.adt_size' to the wireless power transmitter, so that the maximum ADT size (i.e., 'SRQ/max.adt_size') can be negotiated between the wireless power transmitter and the wireless power receiver. Additionally, the wireless power receiver may send CE to the wireless power transmitter based on the CEP interval while the wireless power transmitter transmits the ADT to the wireless power receiver.

In this case, the wireless power receiver can transmit a CE packet to the wireless power transmitter before transmitting DSR/ack, providing the advantage of a fast control loop, that is, fast power control.

Example of Use of ADT Transmission Based on Maximum ADT Size

ADT transmission based on the maximum ADT size can be divided into ADT variable type and ADT fixed type. Additionally, the ADT variable type and ADT fixed type based on the maximum ADT size can be explained through drawings as follows.

Figure 34:
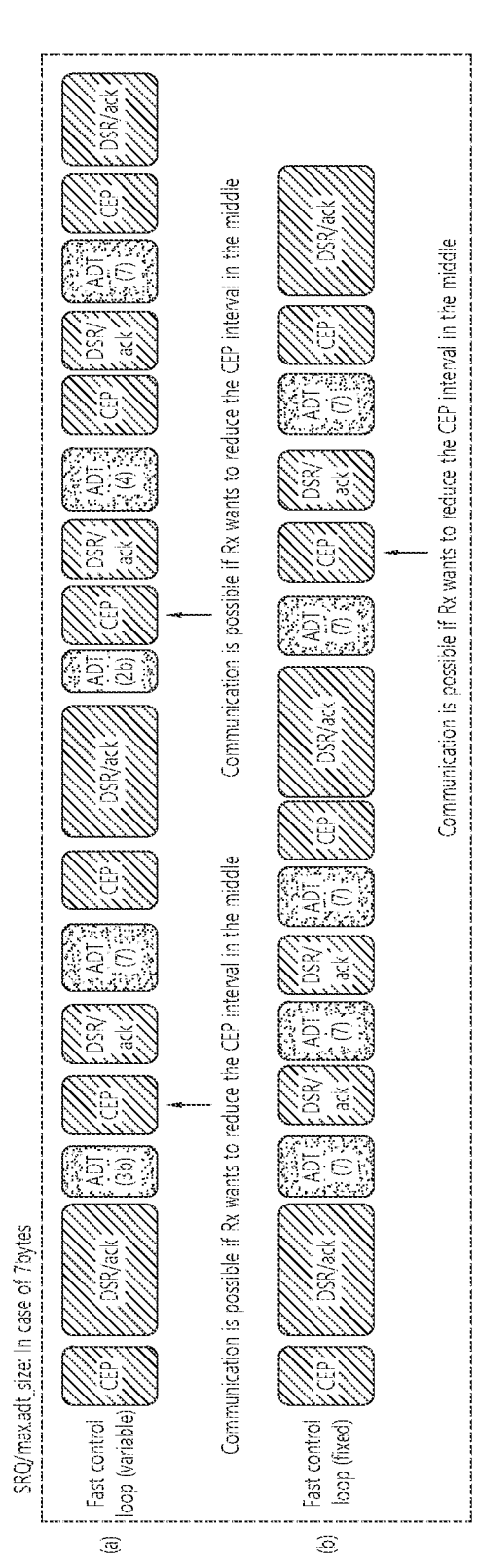
FIG. 34 schematically shows two examples of TPL communication through the maximum ADT size.

FIG. 34 schematically shows two examples of TPL communication through the maximum ADT size.

According to (a) of FIG. 34, the ADT variable type can be explained as follows.

i) ADT variable: By selecting (or negotiating) 'SRQ/max.adt_size' between the wireless power transmitter and/or wireless power receiver, TPL transmission that repeatedly sends ADT with a variable size (of a size equal to or smaller than the size indicated by 'SRQ/max.adt_size') can be called ADT fixed. At this time, even if the actual FSK speed increases due to fast FSK, the maximum supported ADT size may not be considered.

For example, even if the wireless power transmitter and/or wireless power receiver supports an ADT size of up to 27 bytes, the wireless power transmitter and wireless power receiver may not necessarily exchange ADT data with the above ADT size of 27 bytes. If 'SRQ/max.adt_size' indicates 7 bytes, although the wireless power transmitter and/or wireless power receiver may exchange ADT data in units of up to 27 bytes, the wireless power transmitter and/or wireless power receiver may exchange ADT data in variable sizes equal to or less than a maximum of 7 bytes.

According to (b) of FIG. 34, the ADT fixed type can be explained as follows.

ii) ADT fixed type: By selecting (or negotiating) 'SRQ/max.adt_size' between the wireless power transmitter and/or wireless power receiver, TPL transmission that repeatedly sends a fixed ADT (of a size equal to or smaller than the size indicated by 'SRQ/max.adt_size') can be named ADT fixed. At this time, even if the actual FSK speed increases due to fast FSK, the maximum supported ADT size may not be considered.

For example, even if the wireless power transmitter and/or wireless power receiver supports an ADT size of up to 27 bytes, the wireless power transmitter and wireless power receiver may not necessarily exchange ADT data with the above ADT size of 27 bytes. If 'SRQ/max.adt_size' indicates 7 bytes, although the wireless power transmitter and/or wireless power receiver may exchange ADT data in units of up to 27 bytes, the wireless power transmitter and/or wireless power receiver may exchange ADT data in a fixed size equal to or less than a maximum of 7 bytes.

An example request for the maximum ADT size can be summarized as follows.

Because the maximum ADT size in the specification increases from the existing 7 bytes to 27 bytes through fast FSK, the wireless power transmitter and/or wireless power receiver can transmit an ADT having a maximum of 27 bytes.

However, since the wireless power receiver cannot send a CEP (CE packet) to the wireless power transmitter while the wireless power transmitter is sending 27 bytes of ADT, it may be difficult to implement a fast control loop.

Accordingly, in this specification, by adding the 'SRQ/max.adt_size' packet to negotiation, a configuration is provided to negotiate between a wireless power receiver and/or a wireless power transmitter the maximum ADT size that the wireless power transmitter can transmit.

As described above, according to negotiation of the maximum ADT size, the wireless power transmitter may transmit ADT to the wireless power receiver based on one of the two options below according to the negotiated maximum ADT size.

i) ADT variable: If a fast control loop (wireless power receiver and/or wireless power transmitter) is desired, 'SRQ/max.adt_size' can be negotiated to the ADT size of low payload.

The wireless power transmitter can transmit a variable value of ADT that changes each time without fixing a specific value within the negotiated ADT size. For example, even if 'SRQ/max.adt_size' is negotiated to 8 bytes, ADT in units of 6 bytes can be transmitted (continuously or by changing the size). Here, data communication can be performed by exchanging transmissions and responses multiple times between CEP intervals. When a fast control loop is necessary, a fast control loop may be possible at any time because CEP transmission is possible even before transmission of the DSR packet of the wireless power receiver.

ii) Fixed ADT: If a fast control loop (wireless power receiver and/or wireless power transmitter) is desired. 'SRQ/max.adt_size' can be negotiated to the ADT size of low payload.

The wireless power transmitter can transmit ADT by fixing a specific value within the negotiated ADT size. For example, even if 'SRQ/max.adt_size' is negotiated to 8 bytes, ADT in units of 6 bytes can continue to be transmitted fixedly. Here, data communication can be performed by exchanging transmissions and responses multiple times between CEP intervals. When a fast control loop is necessary, a fast control loop may be possible at any time because CEP transmission is possible even before transmission of the DSR packet of the wireless power receiver.

In the case above, since it is possible for the wireless power transmitter to transmit ADT to the wireless power receiver based on a fixed specific value in the value within 'SRQ/max.adt_size', the wireless power receiver can provide the advantage of being able to predict the transmission ADT size of the wireless power transmitter.

The examples presented in this specification will be explained once again as follows. As an example, through fast FSK, the ADT size in the specification can be increased up to 27 bytes.

Here, if the wireless power receiver wants a fast control loop, the wireless power receiver can select 'SRQ/max.adt_size' in the negotiation phase to start negotiation with the wireless power transmitter. Here, considering that it is impossible to transmit CEP as long as the ADT size, the wireless power receiver can select a parameter to be negotiated (i.e., a parameter of 'SRQ/max.adt_size') by calculating the length/time of the interval for which power control is desired.

For example, the wireless power receiver sets the parameter in 'SRQ/max.adt_size' to indicate 4 bytes, by sending 'SRQ/max.adt_size' to the wireless power transmitter, the maximum ADT size can be negotiated with the wireless power transmitter.

In this case, the wireless power transmitter can only transmit ADT within 4 bytes. Here, if the wireless power transmitter continues to send a specific fixed value within 4 bytes, this may mean that the ADT is fixed. And, if the value within 4 bytes changes every time (or occasionally), it may mean ADT variable type.

If the wireless power receiver does not want a fast control loop, the wireless power receiver selects 'SRQ/max adt_size' in the negotiation phase to start negotiation with the wireless power transmitter, the parameter value in the request information can be set to 27 bytes, corresponding to the maximum ADT size of the specification. And, the wireless power receiver can transmit request information indicating the above 27 bytes to the wireless power transmitter.

That is, the wireless power receiver can negotiate with the wireless power transmitter by setting 'SRQ/max.adt_size' to 27 bytes and transmitting it to the wireless power receiver.

In this case, the wireless power transmitter can only transmit ADT within 27 bytes. If a specific fixed value within 27 bytes is continuously sent, it may correspond to ADT fixed type. And, if the value changes every time (or occasionally), it may correspond to an ADT variable type.

3. Conversion of ADT Size According to Change in Request Information

Meanwhile, as described above, even if negotiation between the wireless power transmitter and wireless power receiver is completed in the negotiation phase, the content of this negotiation may be changed in the power transfer phase. That is, the wireless power transmitter and wireless power receiver can perform renegotiation.

At this time, renegotiation being performed may mean that request information related to the ADT size may also be subject to renegotiation. And, an example of this is explained through the drawings as follows.

Figure 35:
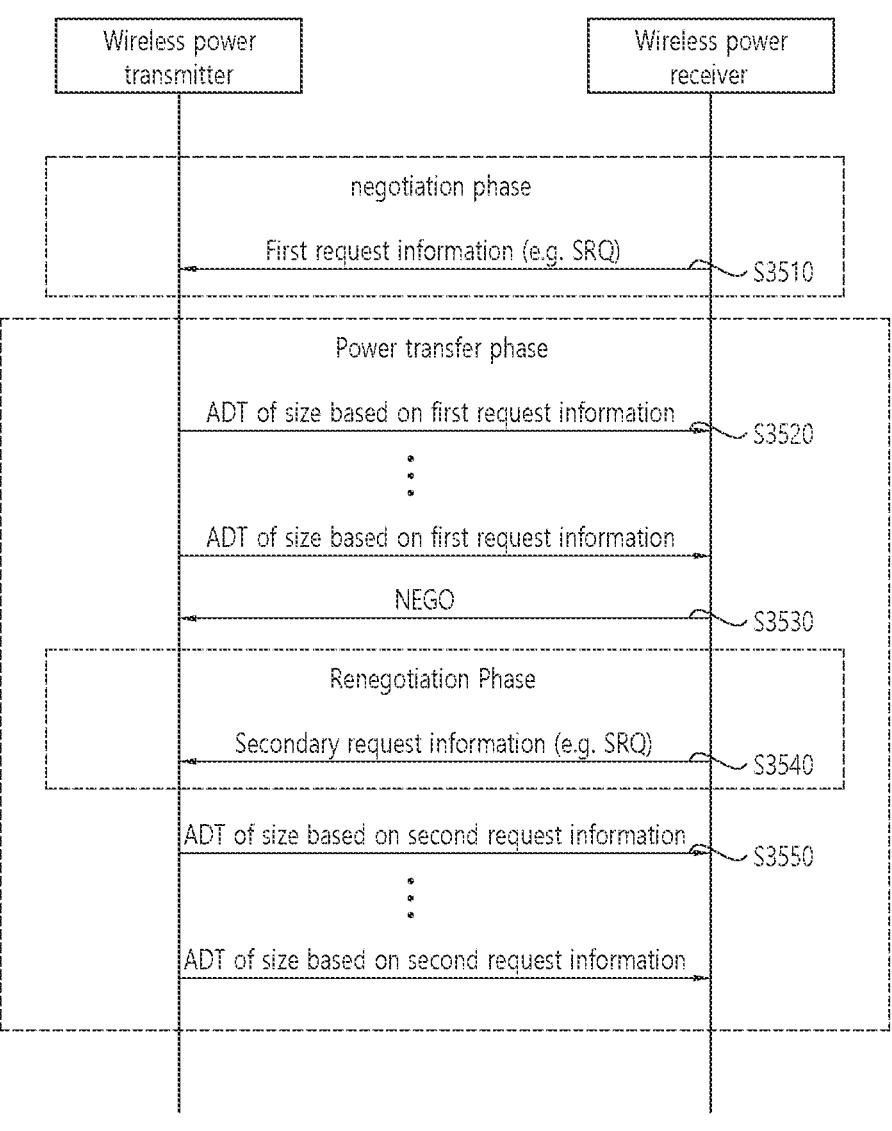
FIG. 35 is a flowchart of an example of conversion of ADT size according to change in request information.

FIG. 35 is a flowchart of an example of conversion of ADT size according to change in request information.

According to FIG. 35, the wireless power transmitter may receive first request information from the wireless power receiver in the negotiation phase (S3510). Here, the first request information may correspond to 'SRQ/adt_size' indicating the fixed ADT size described above, and 'SRQ/max.adt_size' indicating the maximum ADT size (fixed and/or variable).

Thereafter, the wireless power transmitter may transmit an ADT of a size based on the first request information to the wireless power receiver in the power transfer phase (S3520).

During the power transfer phase, the wireless power transmitter may receive a 'NEGO' packet corresponding to information indicating renegotiation from the wireless power receiver (S3530). Then, the wireless power transmitter and wireless power receiver may enter the renegotiation phase.

In the renegotiation phase (included in the power transfer phase), the wireless power transmitter may receive second request information from the wireless power receiver (S3540). Here, the second request information may also correspond to 'SRQ/adt_size' indicating the fixed ADT size described above, and 'SRQ/max.adt_size' indicating the maximum ADT size (fixed and/or variable).

Thereafter, the wireless power transmitter may transmit an ADT of a size based on the second request information to the wireless power receiver in the power transfer phase (S3550).

Here, an example in which the wireless power transmitter transmits ADT information based on first request information and then transmits ADT information based on second request information may be as follows.

Change from 1st 'SRQ/adt_size' indicating a fixed ADT size to 2nd 'SRQ/adt_size' indicating a fixed ADT size Change from 'SRQ/adt_size' indicating a fixed ADT size to (fixed)'SRQ/max.adt_size' indicating the maximum ADT size.

Change from 'SRQ/adt_size', which indicates a fixed ADT size, to (variable) 'SRQ/max.adt_size', which indicates the maximum ADT size.

Change from (fixed) 'SRQ/max.adt_size' indicating the maximum ADT size to 'SRQ/adt_size' indicating a fixed ADT size.

1st (fixed) 'SRQ/max.adt_size' indicating the maximum ADT size->2nd (fixed) 'SRQ/max.adt_size' indicating the maximum ADT size 'SRQ/max.adt_size' indicating the maximum ADT size (fixed type)->'SRQ/max.adt_size' indicating the maximum ADT size (variable type)

Change from (variable) 'SRQ/max.adt_size' indicating the maximum ADT size to 'SRQ/adt_size' indicating a fixed ADT size.

1st (variable type) 'SRQ/max.adt_size' indicating the maximum ADT size->2nd (variable type)'SRQ/max.adt_size' indicating the maximum ADT size 'SRQ/max.adt_size' indicating the maximum ADT size (variable type)->'SRQ/max.adt_size' indicating the maximum ADT size (fixed type)

Here, examples of how each request information is used are the same as described above.

Hereinafter, embodiments of the present specification will be described again from the viewpoint of various subjects.

The following drawings were prepared to explain a specific example of the present specification. Since the names of specific devices or specific signals/messages/fields described in the drawings are provided as examples, the technical features of this specification are not limited to the specific names used in the drawings below.

FIG. 36 is a flowchart of a method for transferring wireless power performed by a wireless power transmitter, according to an embodiment of the specification.

According to FIG. 36, the wireless power transmitter can establish a power transfer contract with the wireless power receiver in the negotiation phase (S3610). Here, the wireless power transmitter receives request information from the wireless power receiver in the negotiation phase, and the request information may be information related to the unit size of at least one auxiliary data transport (ADT) information transmitted by the wireless power transmitter.

The wireless power transmitter can transfer wireless power to the wireless power receiver based on a power transfer contract in the power transfer phase (S3620). Here, the wireless power transmitter may transmit at least one ADT information to the wireless power receiver in the power transfer phase based on information related to the unit size.

Here, the information related to the unit size indicates a fixed size at which the at least one ADT information is transmitted, the wireless power transmitter may transmit the at least one ADT information to the wireless power receiver in units of the fixed size.

For example, the fixed size may include a first size or a second size, and the first size may be larger than the second size. In this case, based on the information related to the unit size indicating the first size, the wireless power transmitter can transmit a greater amount of information during the fixed size compared to when the second size is known. Meanwhile, based on the fact that the information related to the unit size informs the second size, the wireless power transmitter may receive control error (CE) packets more frequently from the wireless power receiver than when the first size is known.

Also, as an example, the information related to the unit size indicates the maximum size at which the at least one ADT information is transmitted, the wireless power transmitter may transmit the at least one ADT information to the wireless power receiver in units within the maximum size. At this time, the wireless power transmitter may transmit the at least one ADT information to the wireless power receiver in units of a fixed size within the maximum size. On the other hand, the wireless power transmitter may transmit the at least one ADT information to the wireless power receiver in units of variable size within the maximum size.

Here, the wireless power transmitter receives information related to the number of cycles of FSK from the wireless power receiver in the negotiation phase, the wireless power transmitter may transmit the at least one ADT information to the wireless power receiver based on information related to the number of cycles of the FSK.

Although not separately shown, according to an embodiment of the present specification, a wireless power transmitter may be provided. A wireless power transmitter may include a power converter associated with transferring wireless power to a wireless power receiver and a communicator/controller associated with communicating with the wireless power receiver and controlling the transfer of wireless power. The communication device/controller is configured to establish a power transfer contract with the wireless power receiver in the negotiation phase, and, in the power transfer phase, may be configured to transfer the wireless power to the wireless power receiver based on the power transfer contract. The wireless power transmitter receives request information from the wireless power receiver in the negotiation phase, the request information is information related to the unit size of at least one ADT (auxiliary data transport) information transmitted by the wireless power transmitter, and the wireless power transmitter may transmit the at least one ADT information to the wireless power receiver in the power transfer phase based on information related to the unit size.

FIG. 37 is a flowchart of a method of receiving wireless power performed by a wireless power receiver, according to an embodiment of the present specification.

According to FIG. 37, the wireless power receiver can establish a power transfer contract with the wireless power transmitter in the negotiation phase (S3710). Here, the wireless power receiver transmits request information to the wireless power transmitter in the negotiation phase, and the request information may be information related to the unit size of at least one auxiliary data transport (ADT) information received from the wireless power transmitter.

The wireless power receiver may receive wireless power from the wireless power transmitter based on the power transfer contract in the power transfer phase (S3720). Here, the wireless power receiver may receive at least one ADT information from the wireless power transmitter in the power transfer phase based on information related to the unit size.

Here, the information related to the unit size indicates a fixed size at which the at least one ADT information is received, the wireless power receiver may receive the at least one ADT information from the wireless power transmitter in units of the fixed size.

For example, the fixed size may include a first size or a second size, and the first size may be larger than the second size. In this case, based on the information related to the unit size informing the first size, the wireless power receiver can receive a greater amount of information during the fixed size compared to when the second size is known. Meanwhile, based on the fact that the information related to the unit size informs the second size, the wireless power receiver may transmit control error (CE) packets from the wireless power transmitter more frequently than if the first size is known.

Also, as an example, the information related to the unit size indicates the maximum size at which the at least one ADT information is received, the wireless power receiver may receive the at least one ADT information from the wireless power transmitter in units within the maximum size. For example, the wireless power receiver may receive the at least one ADT information from the wireless power transmitter in units of a fixed size within the maximum size. Also, for example, the wireless power receiver may receive the at least one ADT information from the wireless power transmitter in units of variable size within the maximum size.

Here, the wireless power receiver transmits information related to the number of cycles of FSK to the wireless power transmitter in the negotiation phase, the wireless power receiver may receive the at least one ADT information from the wireless power transmitter based on information related to the number of cycles of the FSK.

Although not separately shown, according to an embodiment of the present specification, a wireless power receiver may be provided. A wireless power receiver may include a power pickup associated with receiving wireless power from a wireless power transmitter and a communication/controller associated with communicating with the wireless power transmitter and controlling the reception of the wireless power. The communication/controller may be configured to establish a power transfer contract with a wireless power transmitter in a negotiation phase and to receive the wireless power from the wireless power transmitter based on the power transfer contract in a power transfer phase. The wireless power receiver transmits request information to the wireless power transmitter in the negotiation phase, the request information is information related to the unit size of at least one ADT (auxiliary data transport) information received from the wireless power transmitter, and the wireless power receiver may receive the at least one ADT information from the wireless power transmitter in the power transfer phase based on information related to the unit size.

So far, the embodiments of this specification have been described. And, according to the above-described embodiments, the following effects may commonly occur.

To explain the effect, the problem situation explained earlier can be summarized as follows.

As described above, according to the current TPL, even if the wireless power transmitter transmits ADT data to the wireless power receiver at high speed based on fast FSK, the actual transmission time of the entire data transmission stream is not significantly reduced. The reason for this is that, as explained in FIG. 24, there is a section in which communication due to fast FSK is not performed.

And the reason why the above section occurs is because, according to the current protocol, there is no regulation for the ADT transmission size based on fast FSK between the wireless power receiver and the wireless power transmitter.

Accordingly, as previously described, this specification provides a configuration in which a wireless power receiver and a wireless power transmitter negotiate the size of an ADT packet to be performed in the negotiation phase.

In this way, when negotiating the size of the ADT packet in the negotiation phase, a section in which communication is not performed can be removed even when the wireless power transmitter transmits the ADT packet to the wireless power receiver. Accordingly, in the case of a data transmission stream between a wireless power transmitter and a wireless power receiver according to the present specification, the data transmission time is substantially reduced.

In addition, according to the present specification, the wireless power transmitter and the wireless power receiver can negotiate a fixed ADT packet size or a maximum ADT packet size (fixed or variable) according to the communication situation through a negotiation phase/renegotiation phase. Accordingly, according to the present specification, the efficiency of the data transmission stream between the wireless power transmitter and/or wireless power receiver can be maximized.

Additionally, based on fast FSK, ADT packets can be transmitted in a short period of time, in addition, because the wireless power transmitter and wireless power receiver can know when the ADT packets will be exchanged, the wireless power receiver according to the present specification can transmit CE packets more frequently to the wireless power transmitter.

That is, according to the present specification, the effect may occur that more frequent (i.e., more precise) power control based on CEP can be supported while transmitting a data transport stream faster than before.

Effects obtainable through specific examples of the present specification are not limited to the effects listed above. For example, there may be various technical effects that a person having ordinary skill in the related art can understand or derive from this specification. Accordingly, the specific effects of the present specification are not limited to those explicitly described in the present specification, and may include various effects that can be understood or derived from the technical features of the present specification.

The claims set forth herein can be combined in a variety of ways. For example, the technical features of the method claims of this specification may be combined to be implemented as a device, and the technical features of the device claims of this specification may be combined to be implemented as a method. In addition, the technical features of the method claims of the present specification and the technical features of the device claims may be combined to be implemented as a device, and the technical features of the method claims of the present specification and the technical features of the device claims may be combined to be implemented as a method.

What is claimed is:

1. A method for transferring a wireless power in a wireless power transfer system, the method performed by a wireless power transmitter and comprising:

receiving, from a wireless power receiver in a negotiation phase, a specific request (SRQ) data packet, wherein the wireless power transmitter establishes a power transfer contract with the wireless power receiver in the negotiation phase based on the SRQ data packet; and performing, with the wireless power receiver in a power transfer phase, a communication based on a frequency shift keying (FSK) based on the power transfer contract, wherein the SRQ data packet includes a specific field representing a number of cycles which make up one FSK bit, wherein the wireless power transmitter transmits a data transport stream to the wireless power receiver in the power transfer phase, wherein the data transport stream includes an initial auxiliary data control (ADC) data packet opening the data transport stream, an auxiliary data transport (ADT) data packet, a final ADC data packet closing the data transport stream, and wherein a maximum size of the ADT data packet increases based on decreasing the number of cycles.

2. The method of claim 1, wherein the maximum size of the ADT data packet is 27 bytes.

3. A wireless power transmitter, comprising:

a power converter related to transferring wireless power to a wireless power receiver; and a communicator/controller related to communicating with the wireless power receiver and controlling transfer of the wireless power, wherein the wireless power transmitter is configured to:

receive, from the wireless power receiver in a negotiation phase, a specific request (SRQ) data packet, wherein the wireless power transmitter establishes a power transfer contract with the wireless power receiver in the negotiation phase based on the SRQ data packet; and perform, with the wireless power receiver in a power transfer phase, a communication based on a frequency shift keying (FSK) based on the power transfer contract, wherein the SRQ data packet includes a specific field representing a number of cycles which make up one FSK bit, wherein the wireless power transmitter transmits a data transport stream to the wireless power receiver in the power transfer phase, wherein the data transport stream includes an initial auxiliary data control (ADC) data packet opening the data transport stream, an auxiliary data transport (ADT) data packet, a final ADC data packet closing the data transport stream, and wherein a maximum size of the ADT data packet increases based on decreasing the number of cycles.

4. A method for receiving a wireless power in a wireless power transfer system, the method performed by a wireless power receiver and comprising:

transmitting, to a wireless power transmitter in a negotiation phase, a specific request (SRQ) data packet, wherein the wireless power receiver establishes a power transfer contract with the wireless power transmitter in the negotiation phase based on the SRQ data packet; and performing, with the wireless power transmitter in a power transfer phase, a communication based on a frequency shift keying (FSK) based on the power transfer contract, wherein the SRQ data packet includes a specific field representing a number of cycles which make up one FSK bit, wherein the wireless power receiver receives a data transport stream from the wireless power transmitter in the power transfer phase, wherein the data transport stream includes an initial auxiliary data control (ADC) data packet opening the data transport stream, an auxiliary data transport (ADT) data packet, a final ADC data packet closing the data transport stream, and wherein a maximum size of the ADT data packet increases based on decreasing the number of cycles.

5. The method of claim 4, wherein the maximum size of the ADT data packet is 27 bytes.

\* \* \* \* \*